(12) United States Patent
Thogersen

(10) Patent No.: US 10,021,531 B2
(45) Date of Patent: *Jul. 10, 2018

(54) METHOD AND HAND LUGGAGE TROLLEY FOR FACILITATING A FLOW OF PASSENGERS IN AN AIRPORT TERMINAL

(71) Applicant: Exruptive A/S, Hedehusene (DK)

(72) Inventor: Lars Thogersen, Copenhagen S (DK)

(73) Assignee: EXRUPTIVE A/S, Hedehusene (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,595

(22) Filed: Jul. 10, 2017

(65) Prior Publication Data

US 2017/0374532 A1    Dec. 28, 2017

Related U.S. Application Data

(63) Continuation of application No. 14/780,433, filed as application No. PCT/EP2014/056117 on Mar. 27, 2014, now Pat. No. 9,736,654.

(30) Foreign Application Priority Data

Mar. 27, 2013 (DK) .................................. 2013 70178

(51) Int. Cl.
  *H04W 24/00*    (2009.01)
  *H04W 4/04*    (2009.01)
  (Continued)

(52) U.S. Cl.
  CPC ........... *H04W 4/043* (2013.01); *B62B 3/1424* (2013.01); *B64F 1/366* (2013.01); *G06Q 10/06* (2013.01);
  (Continued)

(58) Field of Classification Search
  CPC .... H04W 4/043; H04W 88/02; B62B 3/1424; B62B 2202/24; H04L 67/42; G08G 99/00;
  (Continued)

(56) References Cited

U.S. PATENT DOCUMENTS

| 5,264,822 A | 11/1993 | Vogelman et al. |
| 9,736,654 B2 * | 8/2017 | Thogersen ............ H04W 4/043 |

(Continued)

FOREIGN PATENT DOCUMENTS

| CN | 101351375 A | 1/2009 |
| WO | WO 2006/061840 A3 | 6/2006 |

(Continued)

OTHER PUBLICATIONS

Amadeus Mobile Messenger, http://www.amadeus.com/corporations/x155838.html, date last accessed: Sep. 25, 2015.

*Primary Examiner* — Amancio Gonzalez
(74) *Attorney, Agent, or Firm* — Muncy, Geissler, Olds & Lowe, P.C.

(57) ABSTRACT

A method and a trolley for facilitating a passenger's way through an airport terminal, and improved methods for boarding aircrafts. The trolley may include an interface, such as a boarding card reader, for receiving information identifying the passenger and/or the passenger's flight. Mobile wireless communication means may be provided at the trolley for receiving airport information data, such as flight departure gate, delay or cancellation information, from a computer network within an airport terminal. Data output means are provided to communicate information to the passenger. The trolley may be X-ray compliant. A communication interface may be provided at the trolley for communicating with a portable device, such as a smartphone or equivalent means of the passenger. Individually selected information based on passenger identity, destination, posi- (Continued)

tion or past collection of passenger behavior may be disseminated to passengers on an individual basis. Passengers may be allowed to pass a gate for aircraft boarding only when called in accordance with a predetermined boarding sequence on the basis of, e.g., seat number or seat row.

23 Claims, 25 Drawing Sheets

(51) Int. Cl.
*H04L 29/06* (2006.01)
*G06Q 10/06* (2012.01)
*B64F 1/36* (2017.01)
*B62B 3/14* (2006.01)
*G08G 99/00* (2006.01)
*G06Q 30/02* (2012.01)
*G06Q 50/28* (2012.01)
*G06Q 10/08* (2012.01)
*H04W 88/02* (2009.01)

(52) U.S. Cl.
CPC ............. *G08G 99/00* (2013.01); *H04L 67/42* (2013.01); *B62B 2202/24* (2013.01); *G06Q 10/06311* (2013.01); *G06Q 10/08* (2013.01); *G06Q 30/0267* (2013.01); *G06Q 50/28* (2013.01); *H04W 88/02* (2013.01)

(58) Field of Classification Search
CPC .... B64F 1/366; G06Q 10/06; G06Q 30/0267; G06Q 10/06311; G06Q 10/08; G06Q 50/28

USPC ...................................................... 455/456.3
See application file for complete search history.

(56) References Cited

U.S. PATENT DOCUMENTS

| | | |
|---|---|---|
| 2001/0028301 A1 | 10/2001 | Geiger et al. |
| 2002/0170961 A1 | 11/2002 | Dickson et al. |
| 2002/0174025 A1 | 11/2002 | Hind et al. |
| 2004/0217166 A1 | 11/2004 | Myers et al. |
| 2005/0122932 A1 | 6/2005 | Walter |
| 2005/0271199 A1 | 12/2005 | Collins, Jr. |
| 2006/0206353 A1 | 9/2006 | Buschi et al. |
| 2007/0066334 A1 | 3/2007 | Butts et al. |
| 2007/0265890 A1 | 11/2007 | Curtis |
| 2008/0169341 A1 | 7/2008 | Soderberg et al. |
| 2009/0008439 A1 | 1/2009 | Kubler et al. |
| 2009/0033067 A1 | 2/2009 | Coelho et al. |
| 2009/0223765 A1 | 9/2009 | Bosma |
| 2012/0200390 A1 | 8/2012 | Saravanan |
| 2013/0268303 A1 | 10/2013 | Messier |
| 2014/0324627 A1 | 10/2014 | Haver et al. |

FOREIGN PATENT DOCUMENTS

| | | |
|---|---|---|
| WO | WO 2009/149491 A1 | 12/2009 |
| WO | WO 2010/123427 A1 | 10/2010 |
| WO | WO 2012/032108 A1 | 3/2012 |

* cited by examiner

GOING TO GATE

AIRPORT PASSENGER
ADDITIONAL FEATURES

| ENTERTAINMENT | INTERNET/ GAMES/INFO ABOUT COUNTRY |
|---|---|

Fig. 19B

METHOD AND HAND LUGGAGE TROLLEY FOR FACILITATING A FLOW OF PASSENGERS IN AN AIRPORT TERMINAL

CROSS-REFERENCE TO RELATED APPLICATIONS

This application is a Continuation of co-pending application Ser. No. 14/780,433 filed on Sep. 25, 2015, which is a U.S. National Stage of International Application No. PCT/EP2014/056117 filed on Mar. 27, 2014, for which priority is claimed under 35 U.S.C. § 120; and this application claims priority of Application No. PA 2013 70178 filed in Denmark on Mar. 27, 2013 under 35 U.S.C. § 119; the entire contents of all of which are hereby incorporated by reference.

BACKGROUND OF THE INVENTION

Field of the Invention

The present invention relates to a method and a hand luggage trolley for facilitating a flow of passengers through an airport terminal. More specifically, the invention relates to a method and a trolley for providing passengers with relevant information, such as flight and way-finding information, during the passengers' stay within the airport terminal, along side with a range of additional individually relevant services, notably within a departure and/or transit area of the airport terminal.

Brief Description of the Related Art

The number of airplane passengers has increased steadily over the past decades, while the cost of travelling by airplane is becoming ever more affordable. Airport providers compete to attract airlines and passengers not only through costs but also through convenience facilities and modern airport hence provide a variety of stores, restaurants and other user-convenience facilities.

As a result of the ever-increasing amount of air traffic, airports (sometime even referred to as "non-places") tend to become bigger, and most major international airports comprise several terminals and a vast number of departure gates, wherein the departure gates of each terminal are usually distributed along several so-called fingers, concourses or piers. One consequence of the growth of airports is that passengers are required to walk large distances, and that passengers are demanded to navigate through airport terminals by following signs to the appropriate departure gates.

It is well-known that departure gates may change with short notice and that flight delays may be announced with equal short notice, and passengers are hence also required to keep themselves up-to-date via monitors within the airport terminal.

Flights are frequently delayed by passengers who arrive late at the departure gate after having been lost within the airport terminal. From time to time, such delays are significant, in case a passenger's luggage has to be located and off-loaded. From the departing passengers' point of view, gate changes and delays incur stress and lead to waste of time, in particular under circumstances where a passenger finds himself/herself waiting at a gate for an extended period of time, from which the passenger could have benefited in a lounge or shopping area at the airport in question. From the airport providers' point of view, it is generally desirable that waiting passengers spend extended waiting time at restaurants, shops, lounges etc. rather than at the departure gates.

The present invention aims at turning passengers referred to as "late-gaters" and "early-gaters" into "on-time gaters", i.e. to ensure that passengers arrive at their designated departure gate at an appropriate point in time. An "early gater" is a lost customer of airport shops and restaurants, and a "late-gater" can cause flight departure delays, which in turn frequently lead to loss of slot time at arriving airports, thereby increasing operational costs of airlines and compromising gate efficiency at the airport in question.

Once the passenger has been guided, preferably on time, to the gate, the boarding of aircrafts often takes more time than strictly necessary. Given that most aircrafts only provide one access door, or at most two access doors, and that encouragements for passengers in the aircraft's front rows to defer embarkation until passengers in the back rows have boarded often are disregarded, a need exists for expediting boarding of aircrafts.

The present invention aims at alleviating these inconveniences and minimizing passenger hassle occurring as a consequence of gate changes and delays and to improve passenger experience through convenient guidance to individually relevant services. It is a further object of embodiments of the invention to allow airport providers to improve services through relevant monitoring and information gathering of passenger behaviour.

SUMMARY OF THE INVENTION

More specifically, it is an object of embodiments of the invention to provide a method for efficiently disseminating relevant flight-related information to passengers within an airport terminal. It is a further object of embodiments of the invention to provide a method and a trolley, which is inexpensive. It is a further object of embodiments of the invention to provide a method and a trolley, which is capable of benefiting from the passengers' portable devices, such as a smartphones. It is a further object of embodiments of the invention to provide a method for expediting boarding of aircrafts.

In a first aspect the invention provides a method for facilitating a flow of passengers in an airport terminal, comprising the steps of:

providing a computer network within the airport terminal, the computer network being optionally connected to one or more remote networks, the computer network within the airport terminal comprising:

at least one server comprising a data storage unit storing airport information data selected from flight departure information and passenger wayfinding information;

stationary wireless communication means for dissemination of the airport information data;

continuously or intermittently updating the airport information data in the data storage unit of the at least one server;

providing a plurality of hand luggage trolleys;

assigning one of the trolleys to each of the passengers, each trolley comprising:

an interface for receiving information identifying the passenger, to which the trolley is assigned, and/or the passenger's flight;

an electronic control unit connected to the interface, the electronic control unit comprising an electronic memory for storing passenger identification data and/or flight data of the passenger's flight;

mobile wireless communication means for receiving, at the electronic control unit, said airport information data from the at least one server via the stationary wireless communication means of the computer network within the airport terminal, the mobile wireless communication being connected to the electronic control unit and arranged to forward the airport information data to the electronic control unit;

data output means connected to the electronic control unit and arranged to communicate, to the passenger, to which the trolley is assigned, at least a part of the airport information received by the electronic control unit;

identifying, at each of the trolleys, the passenger, to which the trolley is assigned, and/or the passenger's flight;

continuously or intermittently disseminating the airport information data to the trolleys;

receiving the airport information data at each of the trolleys;

selecting parts of the disseminated airport information data, to be forwarded to the passenger, to which the trolley is assigned;

outputting to the passenger the selected parts of the airport information data;

repeating the steps of updating, disseminating and receiving the airport information data as well as the step of outputting the selected parts of the airport information data, as long as the trolley remains assigned to the passenger, so as to thereby facilitate each of the passenger's way through the airport terminal.

As explained in detail below, preferred embodiments of the invention allows the needs of each individual passenger to be accommodated. For example, the airport information forwarded to the electronic control unit preferably includes information relevant to, i.e. useful for the individual trolley and/or passenger, to whom the trolley is assigned.

Each trolley may comprise an interface offering charging of the passenger's mobile device while the passenger uses the trolley or walks along there with.

The step of selecting those parts of the disseminated airport information data, which are to be forwarded to the passenger may be carried out by the electronic control unit of each of the trolleys, or alternatively by external means, such as the computer network of the airport terminal, such as a server thereof. For example, passenger-related information of the passenger holding the trolley, such as passenger identity, nationality, or flight number, departure time or destination may be communicated from the electronic control unit to the computer network, which in turn selects and disseminates relevant information to the individual trolley. The disseminated information may further, or alternatively, be selected on the basis of data entered into the trolley's electronic control unit by the passenger, such as a request to be directed to the nearest toilet facility, a request for shop or restaurant recommendations, or a request for updated departure information. In case the passenger's current position within the terminal is known, that position may be utilized when selecting those parts of the information to be presented to the passenger.

In a second aspect, the invention provides a hand luggage trolley for use in an airport terminal in a system according to the first aspect of the invention, comprising:

an interface for receiving information identifying the passenger, to which the trolley is assigned, and/or the passenger's flight;

an electronic control unit connected to the interface, the electronic control unit comprising an electronic memory for storing passenger identification data and/or flight data of the passenger's flight;

mobile wireless communication means for receiving, at the electronic control unit, airport information data from a computer network within the airport terminal, the mobile wireless communication being connected to the electronic control unit and arranged to forward the airport information data to the electronic control unit;

data output means connected to the electronic control unit and arranged to communicate, to the passenger, to which the trolley is assigned, at least a part of the airport information received by the electronic control unit;

wherein the electronic control unit is configured to:

identify the passenger, to which the trolley is assigned, and/or the passenger's flight;

receive the airport information data;

select parts of the disseminated airport information data to be forwarded to the passenger, to which the trolley is assigned;

output to the passenger the selected parts of the airport information data.

The airport information received by the electronic control unit may include information, which individually targets the passenger, or it may be general information disseminated to a number of passengers or all passengers.

Additionally, airport shops, restaurants and vendors may be offered to benefit from the trolley and the associated computer network of the airport terminal by allowing such shops, restaurants or vendors to provide advertisements through the trolley in dependence of the passenger-related information, such as the passenger's position or identity. On the basis of the identity of nationality of the passenger, text, audio or video messages may be provided in the native language of the passenger and/or in a language selected by the passenger.

The computer network within the airport terminal is preferably connected to or integral with one or more departure control systems (DCS) within the airport. The DCS of an airport may manage check-in devices, mobile boarding cards, baggage handling, etc. In one embodiment, the DCS may comprise a DCS of Amadeus IT Group, such as Altéa Departure Control, as disclosed and described in Amadeus Altéa Departure Control Flight Management Departure Controller, User Guide, May 2012, as publicly available on the Internet via the following link on the filing date of the instant patent application:

http://www.alc.amadeus.com/content/public/groundhandlers/docs.

The computer network within the airport terminal may alternatively or additionally be operationally connected to other commercially available systems such as Amadeus Mobile Travel Assistant as publicly disclosed on the Internet via the following link on the filing date of the instant application: http://www.amadeus.com/corporations/x155838.html.

Alternative systems, such as Amadeus "Passenger Verification & Tracking" may also be employed.

The airport information data preferably comprises at least flight departure information, including an identification of departure gates and scheduled and/or estimated flight take-off information, preferably in real time. The airport information data may include further information for facilitating the passengers' navigation through the airport terminal and for increasing the passengers' comfort and ease. For example, the airport information data may include shopping and restaurant guides or special offers, walking distance or walking time information from a passenger's current location to the passenger's departing gate. Such information may be dynamically updated. If, for example, the passenger in the terminal area is walking away from the gate of departure, the information about walking time to the gate will increase, and a signal of the trolley for the passenger to turn direction and go to the gate will be provided sooner The selected parts of the airport information data passed to each passenger may comprise a call, such as a text message at the trolley's monitor or at a monitor/display means of the user's portable device, for the passenger to proceed to the gate of the passenger's flight. Hence, passengers may allow themselves to stay at parts of the airport terminal other than the gate area until a point in time when personnel or automated passenger flow systems require passengers to move towards the gate of their flight, and the number of loud-speaker announcements in airports may be reduced, resulting in quiet airport environments. Further, the limited space and number of seats available at gates often result in loss of passenger comfort, and such loss of comfort may be avoided or reduced by allowing the passengers to stay away from the gate until they are called. In one embodiment of the invention, all passengers of a particular flight may be called to the gate simultaneously, whereas in other embodiments, disabled passengers or passengers traveling with children may be called at an earlier point in time than other passengers. In one embodiment of the invention, the gate of a particular flight is not announced anywhere at the airport, until the passengers are called. It may thus be ensured that passengers do not occupy the gate area until they in fact are wanted.

The data passed to the passenger via the trolley and/or personal portable device may comprise a message for the passenger to board the flight. It may thus be achieved that passengers do not proceed to a gate passage point until they receive a personal message instructing them to proceed. Hence, queuing at the gate may be reduced and boarding may consequently be conducted more efficiently. The present invention aims at turning passengers referred to as "late-gaters" and "early-gaters" into "on-time gaters", i.e. to achieve that all or at least the vast majority of passengers arrive at the gate sufficiently early to ensure that boarding may be completed without delays caused by late passengers while also ensuring that passengers do not spend too much time at the gate in advance of the boarding of the flight. An "early gater" is a lost customer of airports shops and restaurants, and a "late-gater" can cause delays, subsequently sometimes leading to lose of slot time in arriving airports causing additional costs for airlines, as well as harming gate efficiency in the airport in question.

Gate efficiency has a great operational impact on all airports. For example, gate changes due to weather conditions, strikes, reallocation of staff, etc. often cause further delays and passenger discomfort. In many cases, late passengers cause gate changes, as all disposable gates often are planned ahead for arrivals, and a late departure caused by a late passenger at a particular gate can force the next aircraft at that gate to block at another gate, often leading to domino effects in busy airport hubs in particular, with all the encountered cost effects and passenger discomfort and stress.

In order to ensure that calls for passengers and other types of information affecting the flow of passengers through the airport are not delayed due to network capacity limitations, the computer network within the airport terminal may be configured to prioritize, over other types of disseminated data, the call for the passenger or said message for the passenger to board.

The step of identifying the passenger and/or the passenger's flight at the trolley may occur by reading a boarding card of the passenger, i.e. user, or by reading another user identification means, such as a credit card of the user, or by otherwise detecting a travel document of the user. Alternatively, the user may identify himself/herself to the trolley by means of a portable device, such as a smartphone, with which the trolley is configured to communication, e.g. through a Bluetooth® connection, any NFC (Near Field Communication) protocol or stand, or any other suitable connectivity system. In a yet further embodiment, the trolley comprises a keyboard or touch screen allowing the user to key in an identification of himself or his flight.

The present invention offers various advantages to transit passengers at the airport and to promote sales of the airport's shops and restaurants. Passengers rarely download airport apps of airports, in which they are in transit, and pushing of local way-finding and shopping-promoting information to transit passengers is hence rendered difficult if not impossible. Thanks to the present invention, however, a transit passenger who has adequately identified himself/herself or the passenger's flight to the trolley, may be provided with relevant and individually customized information. For example, way-finding information may be made available to transit passengers via the trolley's monitor or screen, and, depending on the time until the passenger's flight, accommodation proposals, such as hotel offers, may be made available.

The computer network and the control unit of the trolley preferably provide real-time update of flight departure changes and/or other information comprised in the airport information data. For example, in case the DCS is updated with a gate change, that gate change is immediately communicated by the server of the computer network within the airport terminal to the relevant trolleys in the airport.

In one embodiment, the trolley is configured to communicate with the passenger's personal smart phone or other portable device. In that case, the passenger's portable device may perform some of the above functionality of the control unit of the trolley, such as selection of the relevant parts of the airport information data to show to the user. Further, the graphical user interface of the passenger's personal portable device may be utilized to display the selected parts of the airport information data to the user.

The trolley according to the invention is preferably made entirely from X-ray compliant materials to allow it to pass X-ray at a security check-point within the airport with the passenger's carry-on items, including hand luggage, remaining loaded onto the trolley. One embodiment of a security check-point passage procedure is generally described in international patent publication No. WO 2012/032108, which is hereby incorporated by reference.

In advanced embodiments of the invention, the control unit of the trolley may be configured to allow the passenger to request information, ask questions or browse through a library of information made available at the computer network. Such information request or browsing may conveniently take place via an appropriately programmed user interface, e.g. the user interface of his/her personal portable device.

In a most simple aspect of the present invention, the trolley is configured for way-finding and tracking purposes only.

The computer network within the airport terminal may be connected to computer networks of other airports. In such case, the airport information data may include information to the passenger with regard to gate change, flight delays or cancellations at a further airport, for example an airport, at which the passenger will land for transit. The computer networks of the respective airports may share information obtained from one or more distributed or common departure control systems (DCS). Information may be presented to the passenger in real-time, i.e. as soon as the DCS are updated, information is passed on to the passengers.

The trolley of the present invention may comprise a rechargeable battery pack for powering electronic control, data transmission and display means of the trolley, and a charging interface for charging the battery pack when the trolley is parked in a charging dock. Alternatively a generator may be integrated with the trolley, which generates electrical energy for charging the battery pack as the trolley is moved by the passenger.

In a third aspect, the present invention provides a system comprising a plurality of trolleys according to the second aspect of the invention, each comprising a rechargeable battery pack, and at least one charging dock for charging the battery pack of the trolley, when the trolley is parked in the charging dock.

The present invention also provides a system comprising a plurality of trolleys according to the second aspect of the invention, each comprising a fuel cell arrangement that includes fuel-containing means, such as cavities in injection-moulded parts, the fuel comprising, e.g., a low concentration non-flammable methanol solution, to run the described intelligent platform and communication means of the trolley.

The trolley and computer network of the airport terminal may cooperate to track trolleys and to detect the whereabouts of individual trolleys and to detect usage of trolleys. Hence, it may also be ensured that a particular minimum required number of trolleys is always available at certain locations, notably pick-up stations of trolleys for passengers. Such pick-up stations may, for example, be provided upstream of airport security checkpoints such as those described in international patent publication No. WO 2012/032108, or at any other appropriate location within or in the vicinity of an airport terminal. The traceability of the individual trolley greatly improves trolley management system and renders recollection of trolleys more efficient and enhances maintenance, as a precise record of usage for the individual trolley can be embedded.

Advertisements provided at the trolley may conveniently be provided in the passenger's native language or in a language selected by the passenger. Further, the position of the trolley and hence the passenger occupying the trolley may be detected, and advertisements may be provided, for example in text or video format, depending on the trolley's position and/or direction of movement in order to guide the passenger to a nearby shop or restaurant.

Subject to applicable rules for data collection and usage, collection of passenger-related information at the trolley also allows for tracking of passengers' movements around the airport terminal and detection of so-called dwell time at specific points of interest. Based on collection of big data, customized and efficient advertisement information may be individually targeted to passengers based, e.g., on nationality, age, sex, destination or any other passenger-related data.

In a fourth aspect, the invention provides a method for boarding an aircraft, comprising:
- assembling a plurality of passengers at or near a gate of an airport, each passenger being checked-in for the aircraft's next flight;
- providing a database list of the passengers and, in respect of each passenger, a flight attribute, the flight attribute including at least one of:
- a row number of the passenger's seat in the aircraft;
- the class of flight booked by the passenger;
- information providing a preferred or predetermined boarding moment for the passenger;
- a disability, child or child-accompanying status of the passenger;
- defining a preferred or predetermined order of the plurality of passengers' boarding of the aircraft on the basis of said flight attributes;
- calling passengers individually to proceed to a boarding point at the gate in accordance with said preferred order of boarding, the step of calling passengers individually being carried out through wireless data transmission to a portable device in the passenger's possession or in the vicinity of the passenger, such as through messages displayed on a screen or monitor of the portable device.

Boarding of the aircraft may thus be efficiently controlled, as passengers may be individually invited to enter the aircraft in a preferred order, i.e. in compliance with a preferred boarding order. A minority of passengers not holding a portable device, such as a smartphone or a trolley according to the second aspect of the invention, or who have not identified themselves to such device, may be individually called through loudspeaker announcements at the gate, or they may have to accept to board the aircraft once passengers having identified themselves to their portable devices or trolleys and having been called via such devices have completed boarding.

In a fifth aspect, the invention provides a further method for boarding an aircraft, comprising:
- assembling a plurality of passengers at or near a gate of an airport, each passenger being checked-in for the aircraft's next flight, and each passenger holding a passenger identifier;
- providing a database list of the passengers and, in respect of each passenger, a flight attribute, the flight attribute including at least one of:
- a row number of the passenger's seat in the aircraft;
- the class of flight booked by the passenger;
- information providing a preferred or predetermined boarding moment for the passenger;
- a disability, child or child-accompanying status of the passenger;
- defining a preferred or predetermined order of the plurality of passengers' boarding of the aircraft on the basis of said flight attributes;
- providing a normally closed access barrier at a boarding point of said gate for controlling the passenger's access to the aircraft, said access barrier comprising a passenger-identifier reader and a controller for opening the access barrier upon detection of a valid boarding pass;
- controlling the controller of the access barrier to sequentially permit the passengers to pass the barrier in accordance with the preferred or predetermined order of boarding.

The method of the fifth aspect of the invention hence provides a physical barrier to passengers, who are not invited to board the aircraft. Boarding passengers may be supported by displaying messages at a portable device of the passengers indicating when it is each individual passenger's boarding turn, and/or by stationary display means at the gate, such as next to the barrier.

BRIEF DESCRIPTION OF THE DRAWINGS

Embodiments of the invention will now be further described with reference to the drawings, in which:

FIGS. 10A-10C, 11A-11B, 12, 13, 14A-14D, 15A-15C, 16, 17, 18A-18B, and 19A-19B are flow charts illustrating embodiments of the method of the present invention.

DETAILED DESCRIPTION OF THE PREFERRED EMBODIMENTS

Figure 1:
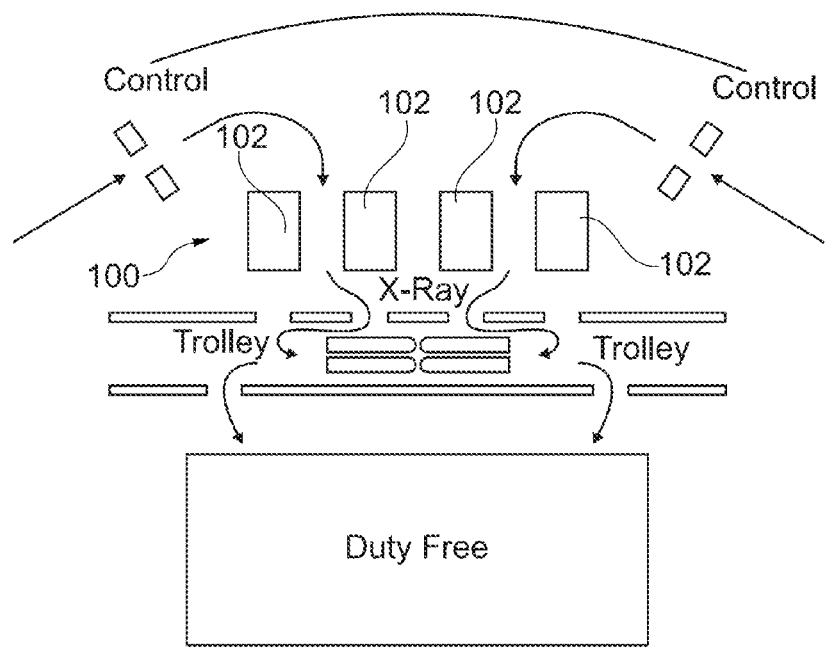
FIGS. 1 and 2 illustrate the flow of passengers and carry-on items in a prior art system for conducting security check at an airport.

The flow of passengers through a security check point in an example of a prior art airport terminal is illustrated by arrows in FIG. 1. As shown, the passengers initially pass a control check point, at which the passengers' id and/or boarding cards are checked or verified. Subsequently, the passengers queue at a security check point 100, comprising, in the example shown, four x-ray imaging scanners 102 at four parallel security check lines. At the downstream side of the security check point 100, the passengers may pick up a trolley for their carry-on items (hand luggage) and optionally further items shopped at the security-restricted zone of the airport departure terminal.

Figure 2:
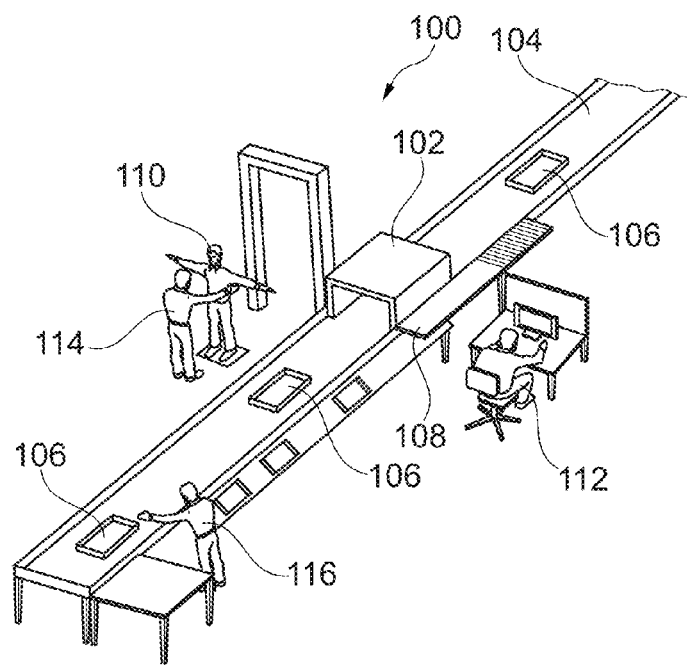

The flow of persons 110 and their carry-on items (not shown) in the prior art security check point system 100 of FIG. 1 is generally depicted in FIG. 2. The check point comprises an overhead x-ray imaging scanner 102 positioned over a conveyor belt 104. The carry-on items may be placed directly on the belt 104, or in trays 106 conveyed along the belt and recycled via recycling conveyor 108. A first security officer 112 monitors the output images of the x-ray scanner 102, a second security officer 114 performs an optional manual search or scanning of persons 110, and a third security officer 116 ensures proper placement of emptied trays 106 onto the recycling conveyor 108. A stationary metal detector 118 is provided for detecting metal objects at the body of persons walking there through.

The prior art system and method illustrated in FIGS. 1 and 2 causes delays in the processing of persons and carry-on items at airports and other facilities.

Figure 3:
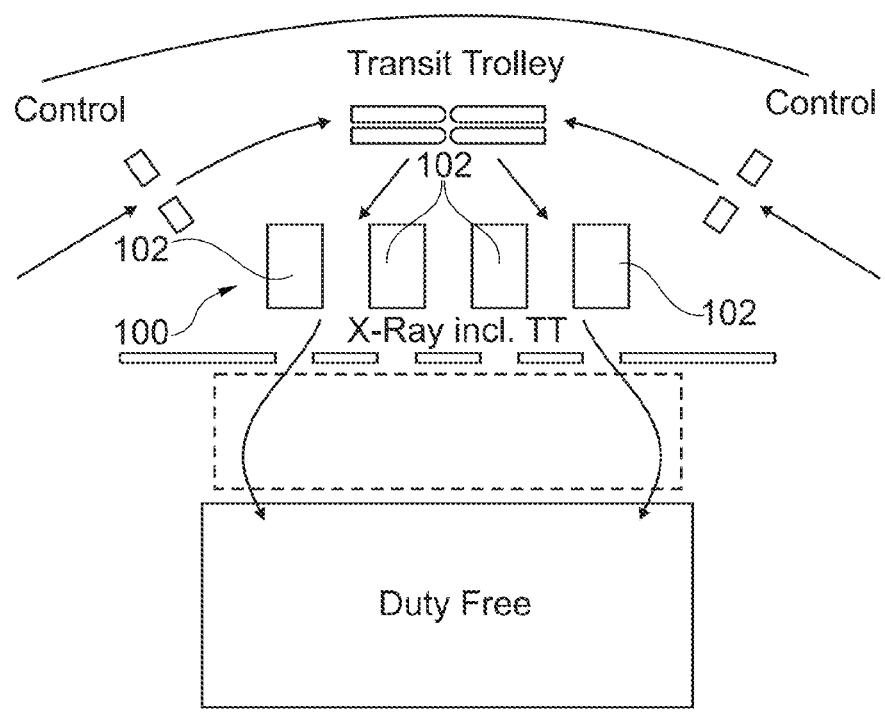
FIGS. 3 and 4 illustrate the flow of passengers and carry-on items in a method according to the present invention.

FIG. 3 generally illustrates a method according to the present invention. By way of example, the flow of passengers through a security check point at the airport terminal is illustrated by arrows in FIG. 3. The passengers pass a control check point, at which the passengers' id and/or boarding cards are checked or verified. Subsequently, the passengers pick up a luggage trolley configured to support their carry-on items, including coats, and configured to be conveyed through x-ray devices 102 along with the carry-on items, while the carry-on items are supported by the trolleys. While the trolleys with a person's carry-on items loaded onto it is passed through x-ray scanning at 102, a security check is conducted on the person himself/herself, e.g. by means of a metal detector and/or by manual search. At the downstream side of the security check point 100, the passengers are united with their luggage trolley, which still supports their hand luggage.

Figure 4:
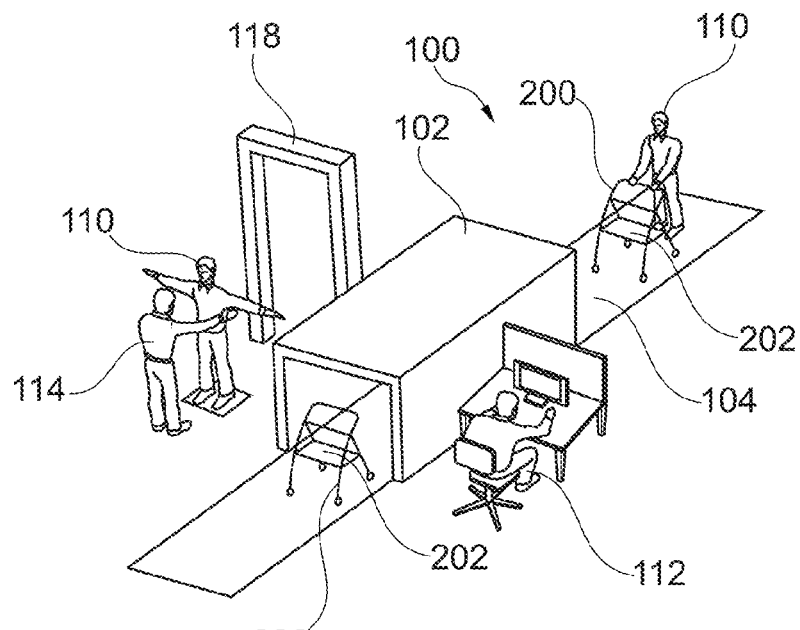
Figure 5:
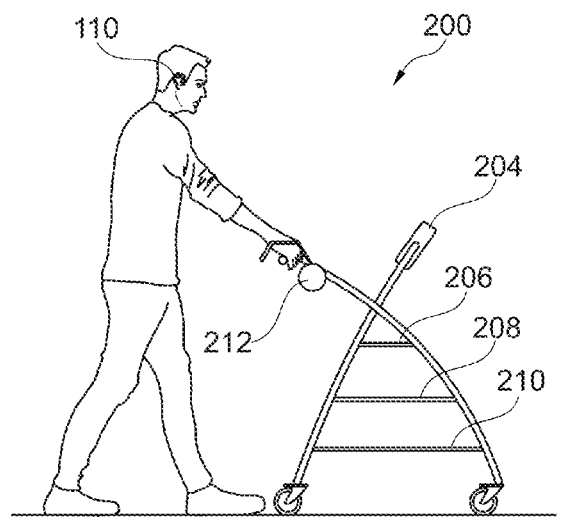
FIGS. 5-9 illustrate embodiments of a luggage trolley 200 according to the present invention.
Figure 6:
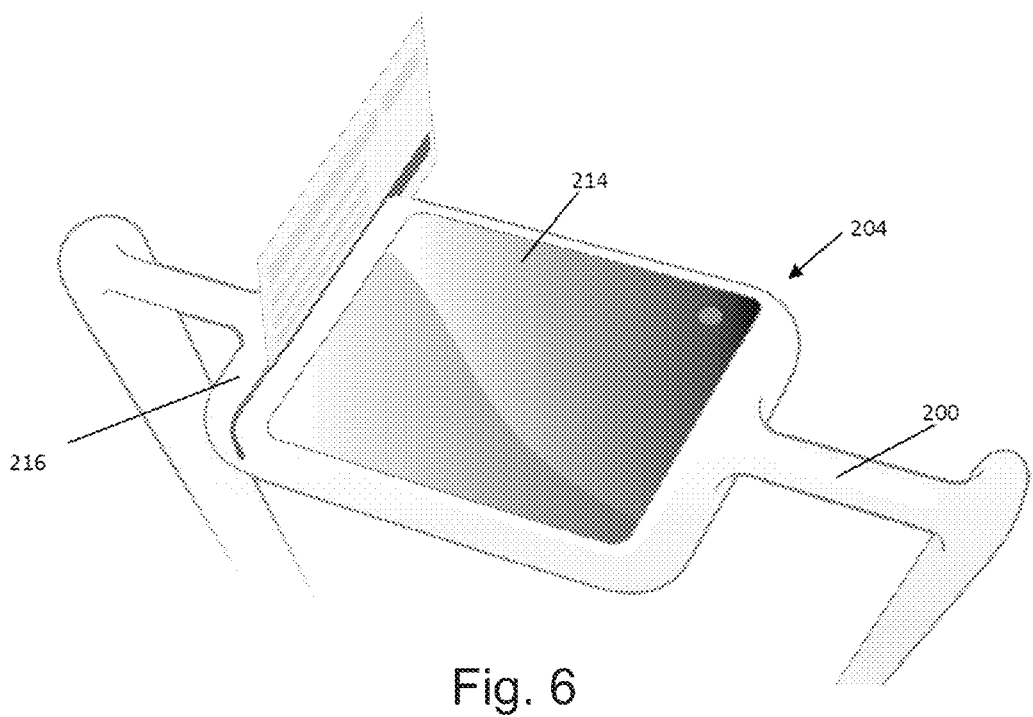

As shown in FIG. 4, miniature luggage trolleys 200 are conveyed through x-ray tunnel (x-ray scanner) 102, while the person, whose carry-on items are supported by the trolley 200, walks through metal detector 118 and is optionally searched by security officer 114. At the same time, security officer 112 monitors the scanned image of the x-ray apparatus.

Figure 7:
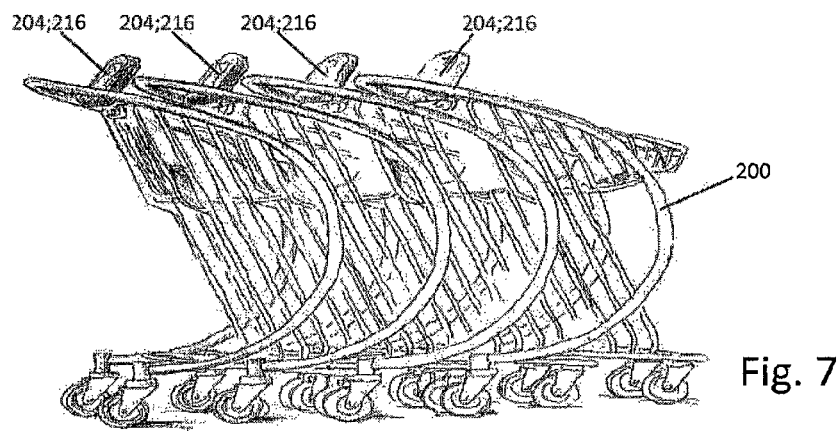
Figure 8:
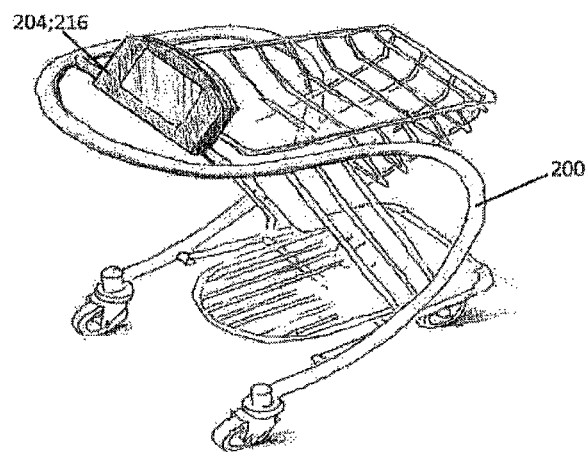
Figure 9:
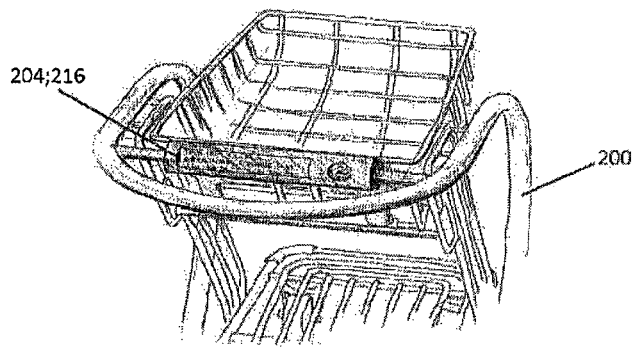
Figure 10A:
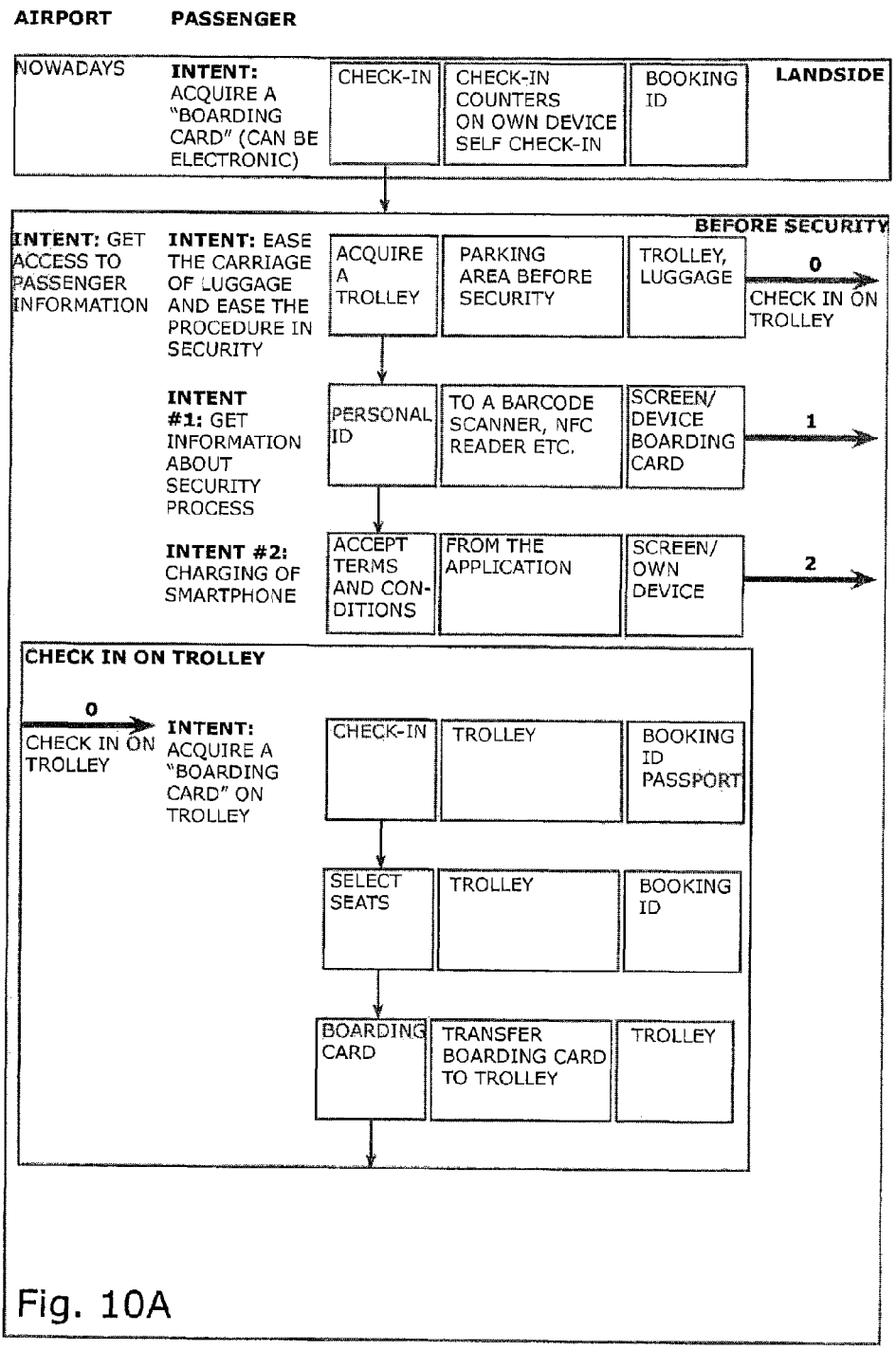
Figure 10B:
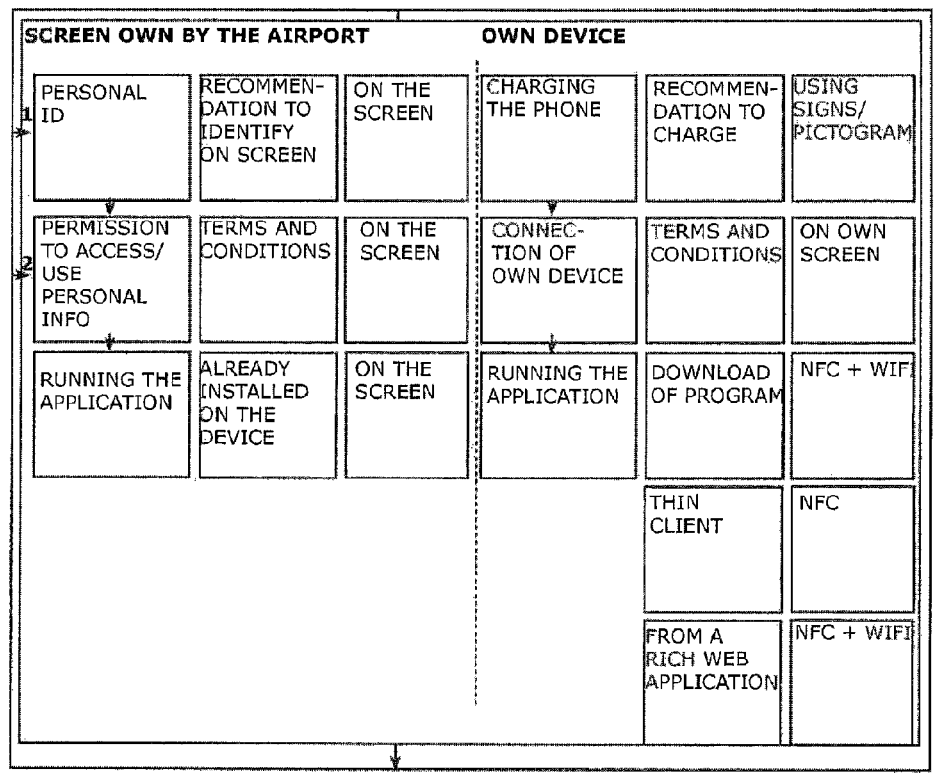
Figure 10C:
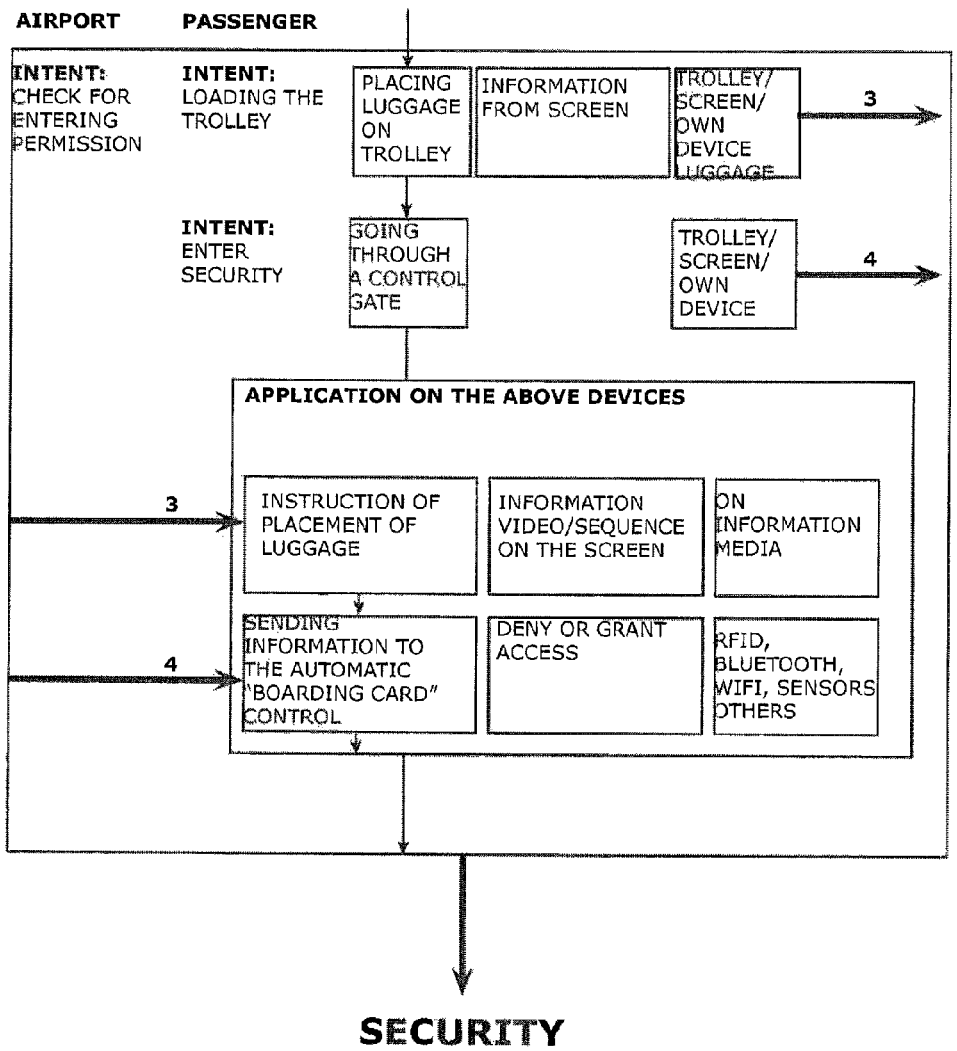
Figure 11A:
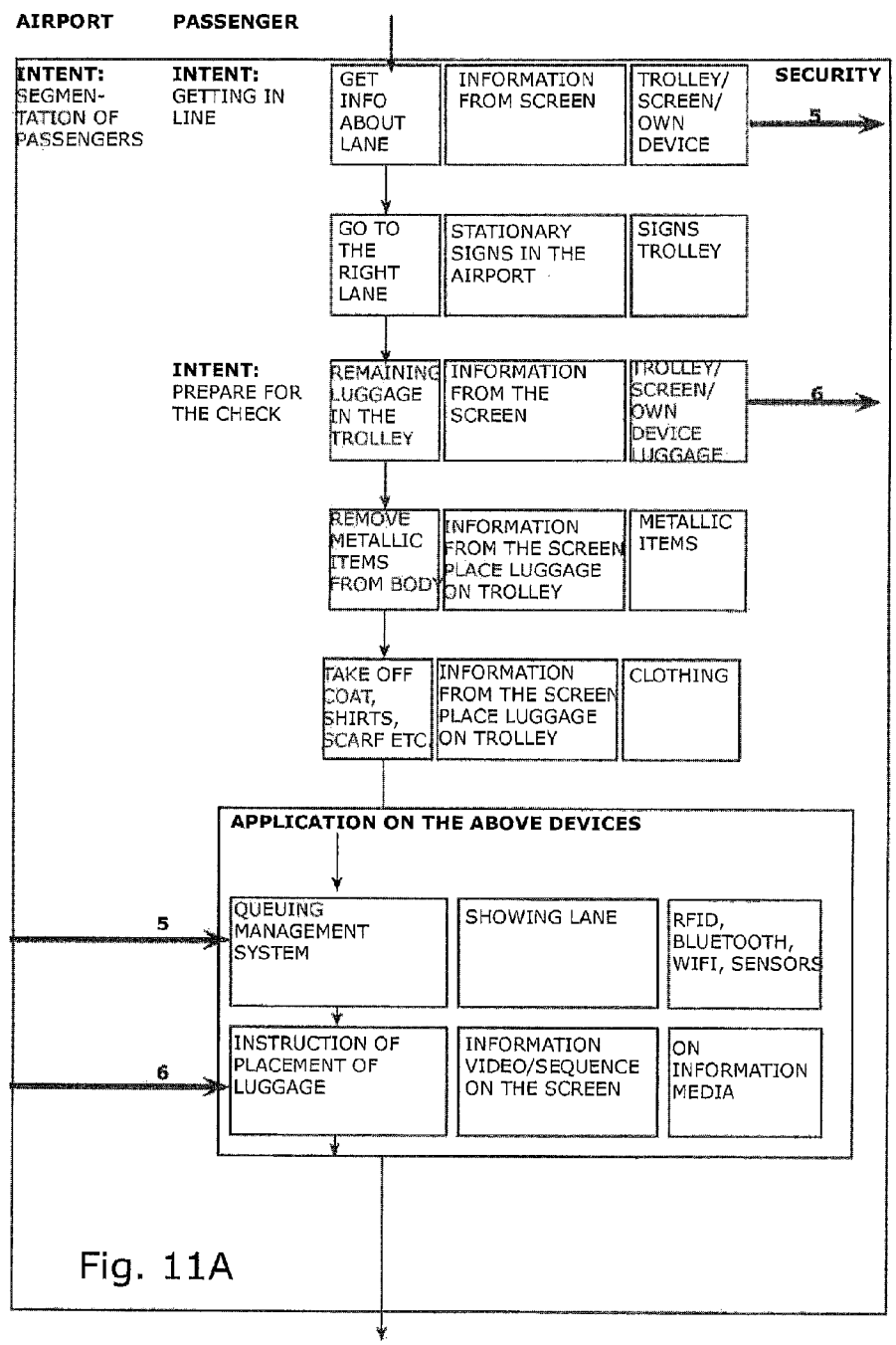
Figure 11B:
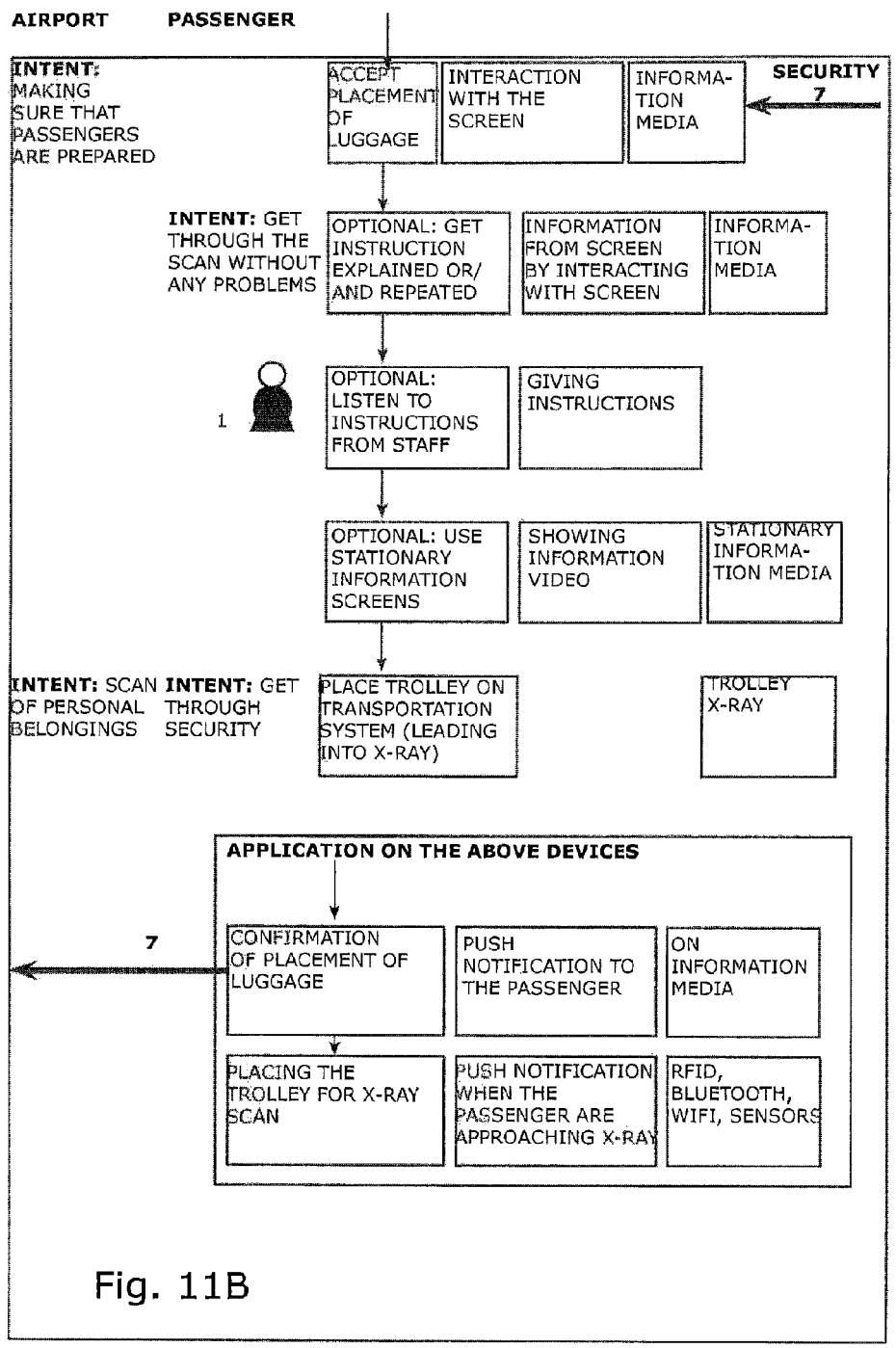

The luggage trolley 200 is illustrated in more detail in FIGS. 5-9. The trolley comprises a display monitor 204 as well as shelves 206, 208 and 210 for the user's laptop, shopping items and hand luggage. A hanger 212 is provided for the user's coat. The display monitor 204 is configured to display information to the person on a display 214. Further, the trolley 200 comprises a user identification interface 216 for identifying the user, e.g. an airplane passenger in order to allow the display monitor to display passenger-specific information. In the embodiment shown in FIG. 6, the user identification interface 216 is in the form of a boarding card reader, however other readers may be employed, such as a credit card reader, a frequent-flyer card reader, a biometric identification system, a communication interface for the passenger's smartphone, etc. The display 214 and the monitor (or screen) 204 is configured to present selected airport information data to the passenger, once the passenger has identified himself/herself. For example, the display may be configured to show updated flight departure information, shopping advertisements, etc. FIGS. 7 and 8 illustrate a first design of the screen 204, and FIG. 9 illustrates a second design thereof.

In order to receive information to be displayed to the user at the display 214, the trolley 200 comprises a communication interface for receiving data from an external unit. A central server (not shown) and a data broadcasting system (not shown) connected to the central server are provided, the data broadcasting system being configured to broadcast information, which can be received at each of the trolleys 200 via the communication interface. The trolley may in turn comprise computer means configured to conduct a person-specific selection of parts of the broadcasted information on the basis of the person's identity and to show said parts of the broadcasted information at the monitor.

The broadcasting system may for example comprise a wireless data transmission network and appropriately configured receivers at the trolleys for receiving wirelessly transmitted data.

The system may in one embodiment be configured to repeatedly broadcast updated versions of information and to update the displayed information at the monitor in accordance with the received updated versions of information. For example, the central server may broadcast flight departure information, including information on possible gate changes or delays. Hence, the user does not have to watch wall- or ceiling-mounted information monitors, but has the departure information readily at hand at his/her personal trolley 200. The display 204 may also display a map of, e.g., the airport, in which the trolley is operated, in order to facilitate the user's navigation through the airport.

The selected parts of the broadcasted information shown to the user may also comprise search and find functionality, such as directions to one or more sites of specific interest to the person operating the trolley, such as e.g. directions to restaurants, toilets, children facilities, service counters etc., in case the user has indicated via a user interface of the trolley that he/she intends to have a meal and/or to benefit from one or more of the aforementioned facilities.

The trolleys 200 may be powered by rechargeable or disposable batteries. In one embodiment, the trolleys are rechargeable in a designated docking station therefor or by built-in charging ability, such as by a touch-based or non-touch (i.e. inductive) electrical generator, or via solar cells.

In one embodiment, the monitors 214 and optionally the user-identification interface 216 may be provided as a retrofit to existing luggage trolleys.

The system according to the invention may further comprise means (not shown) for transferring the trolleys from the site downstream of the security check point to the upstream site upon completion of the persons' use of the trolleys. For example, the trolleys 200 may be collected a designated collection areas and conveyed back to the upstream zone by conveyors, or simply pushed by hand.

Figure 12:
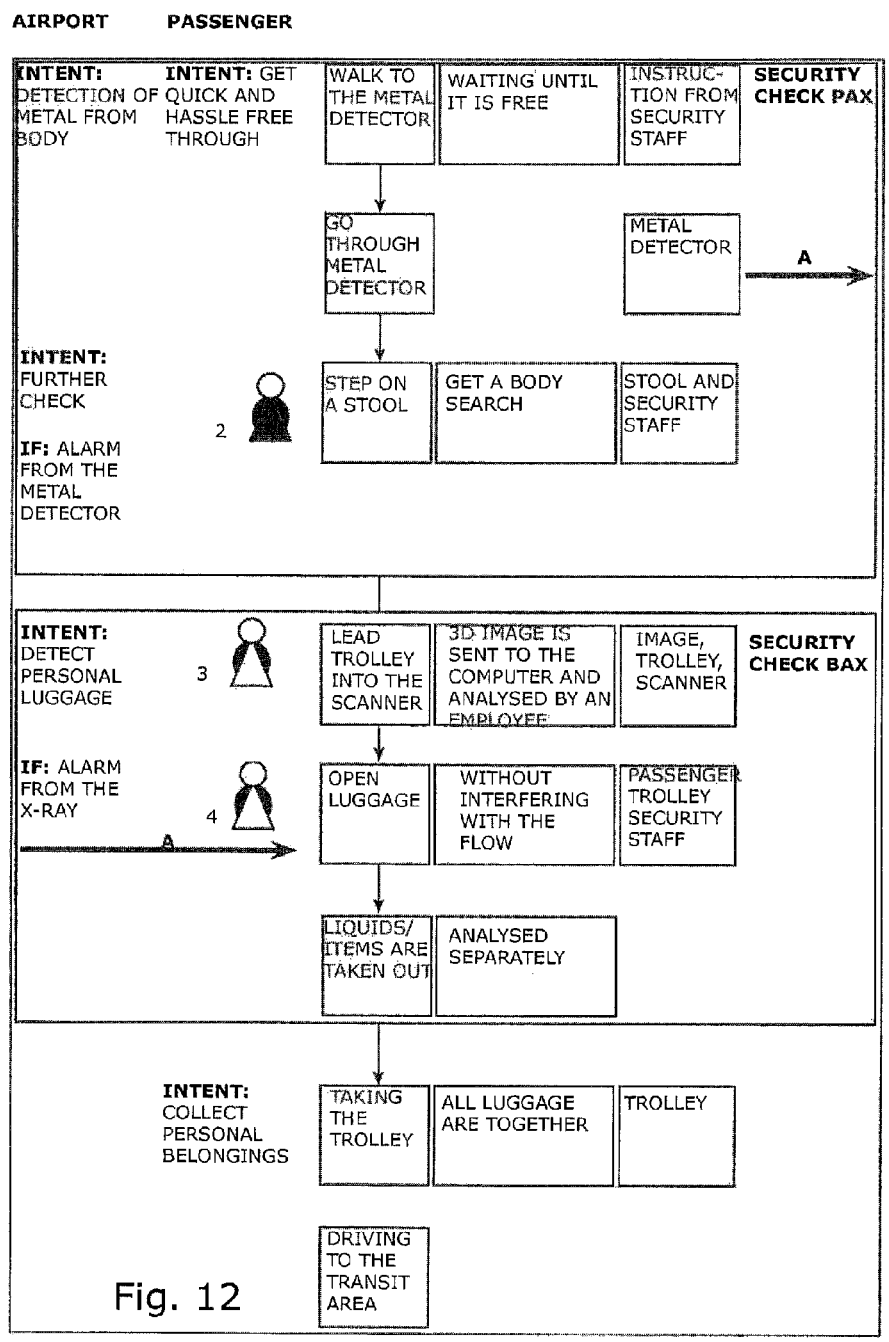
Figure 13:
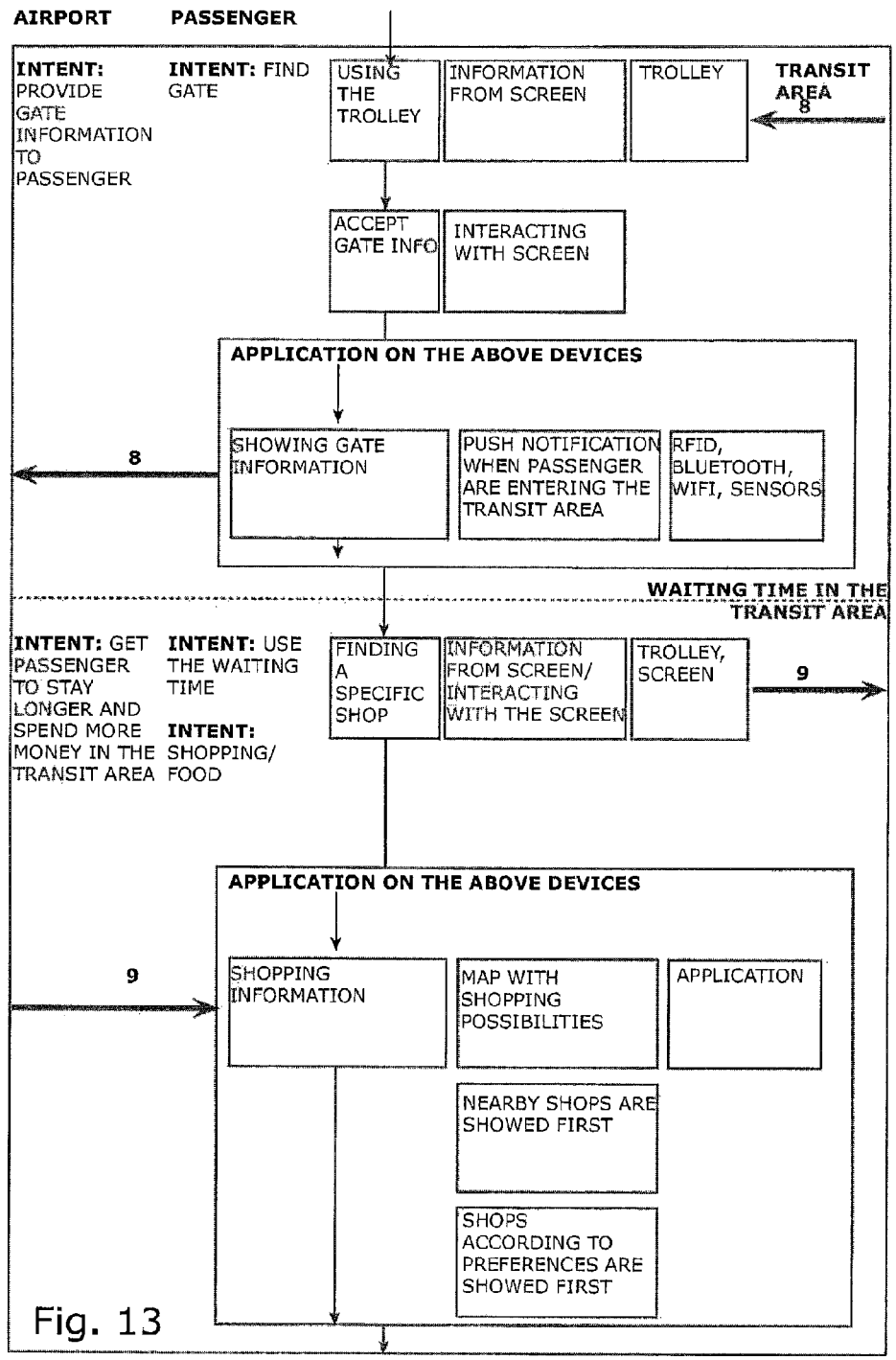
Figure 14A:
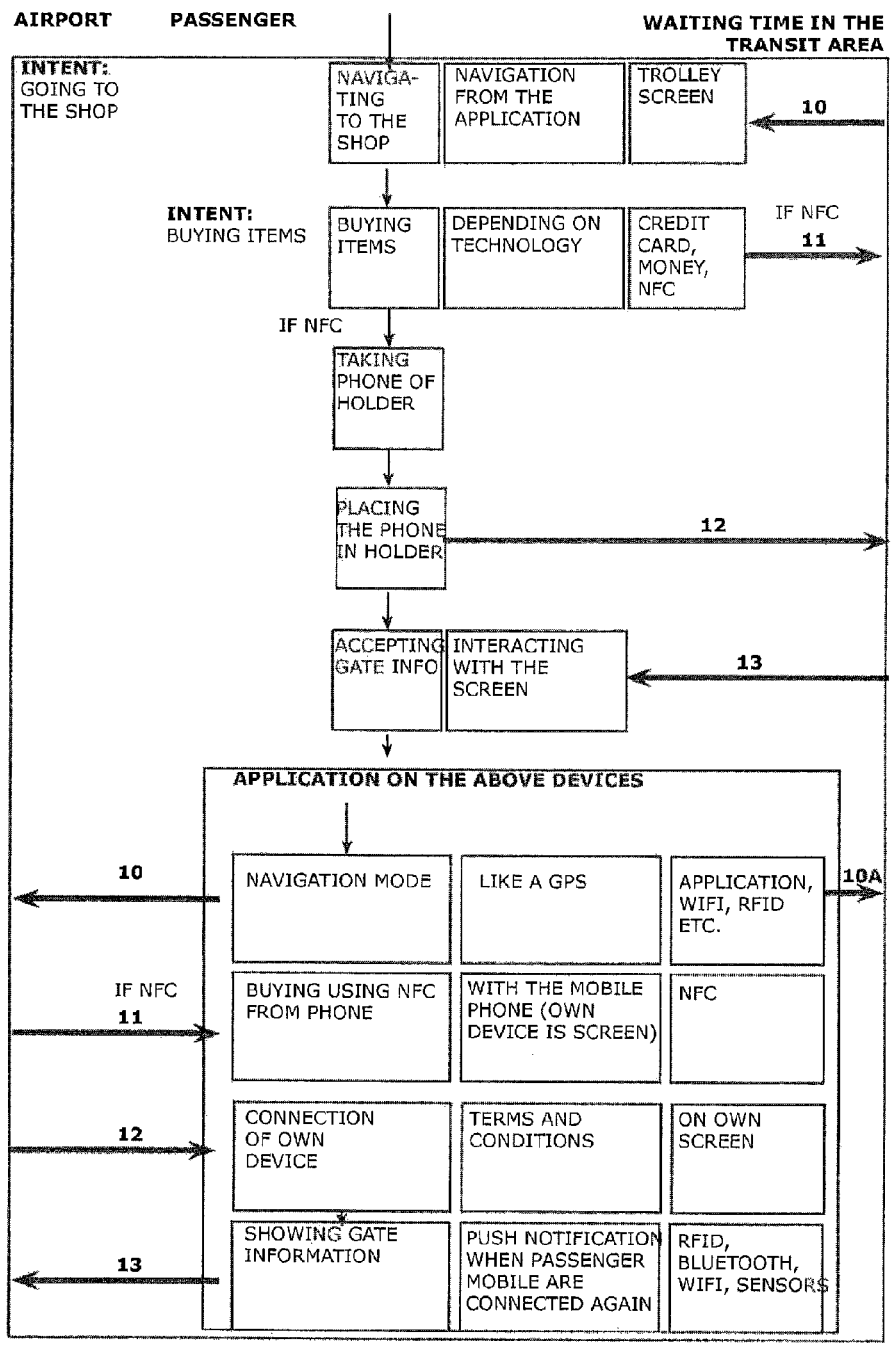
Figure 14B:
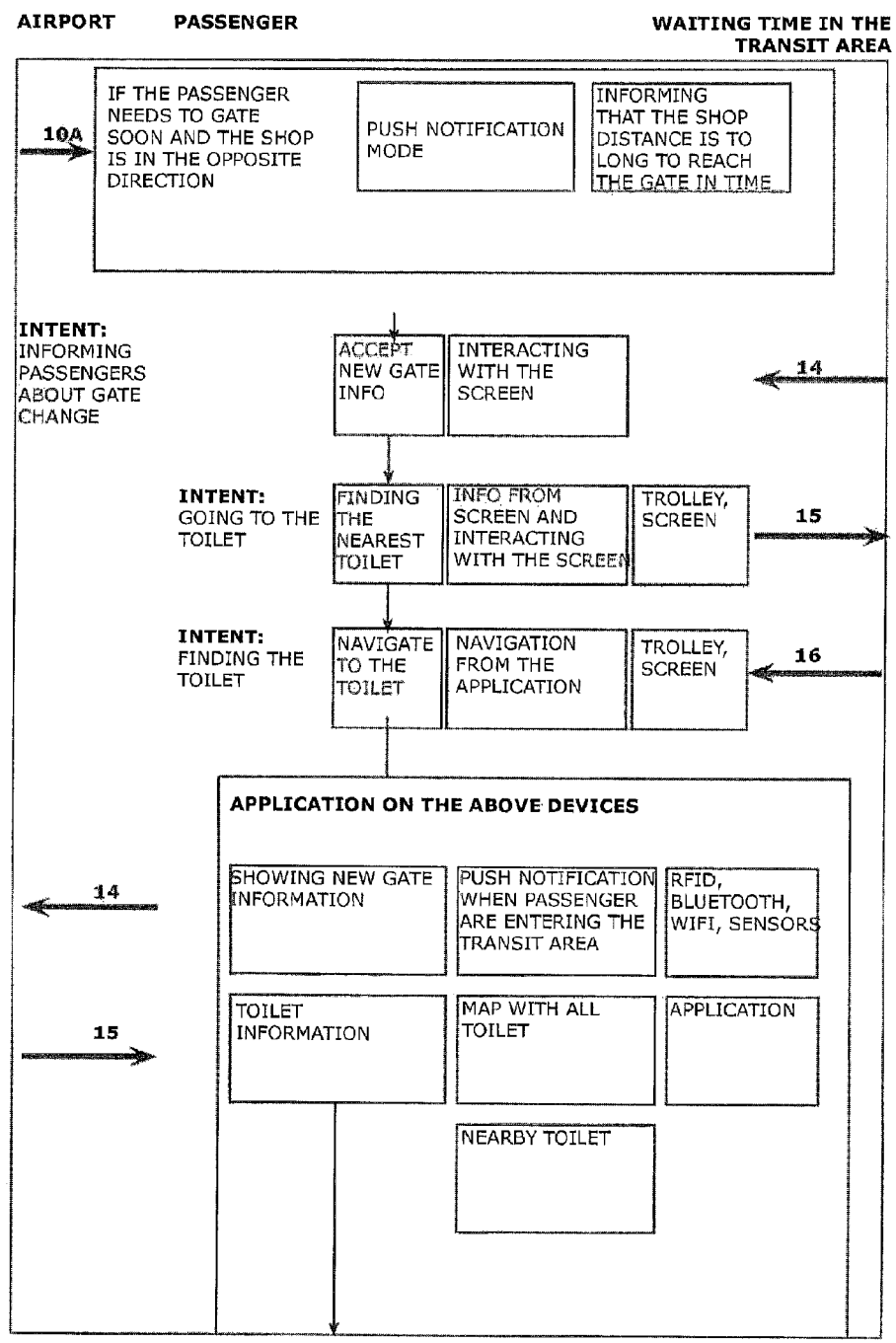
Figure 14C:
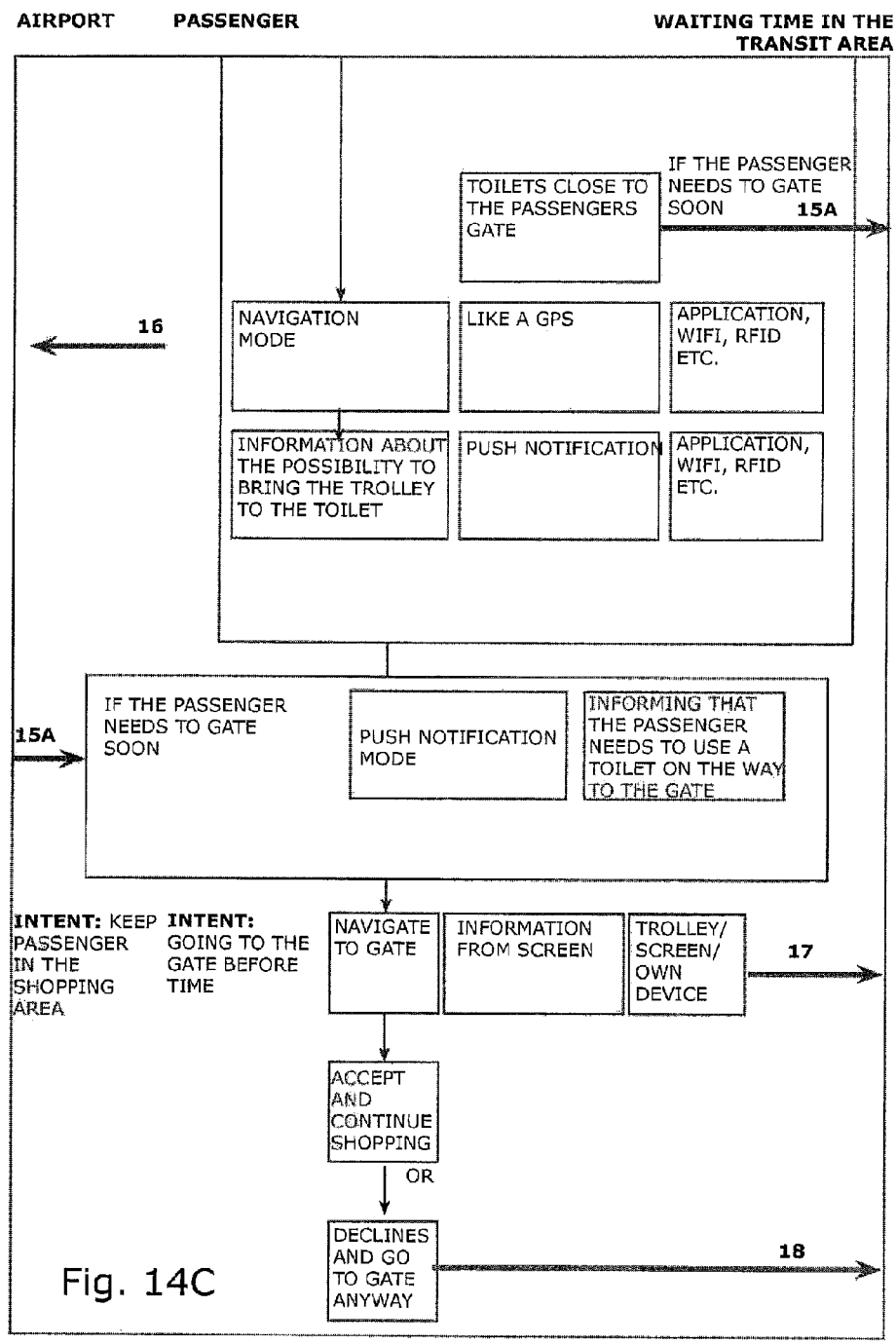
Figure 14D:
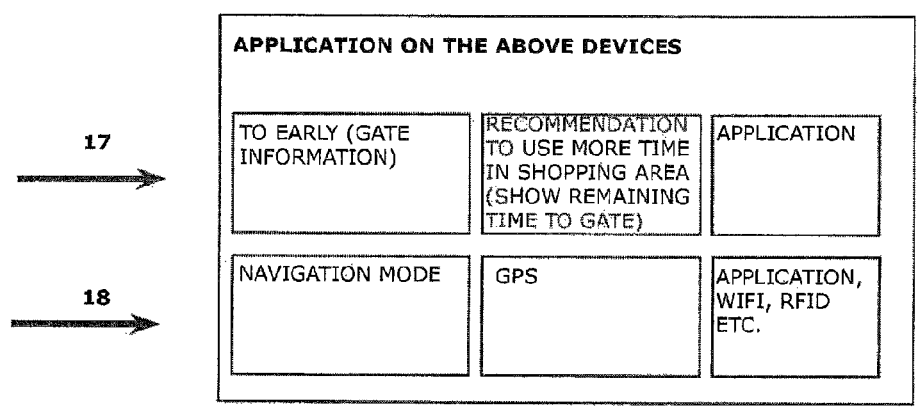
Figure 15A:
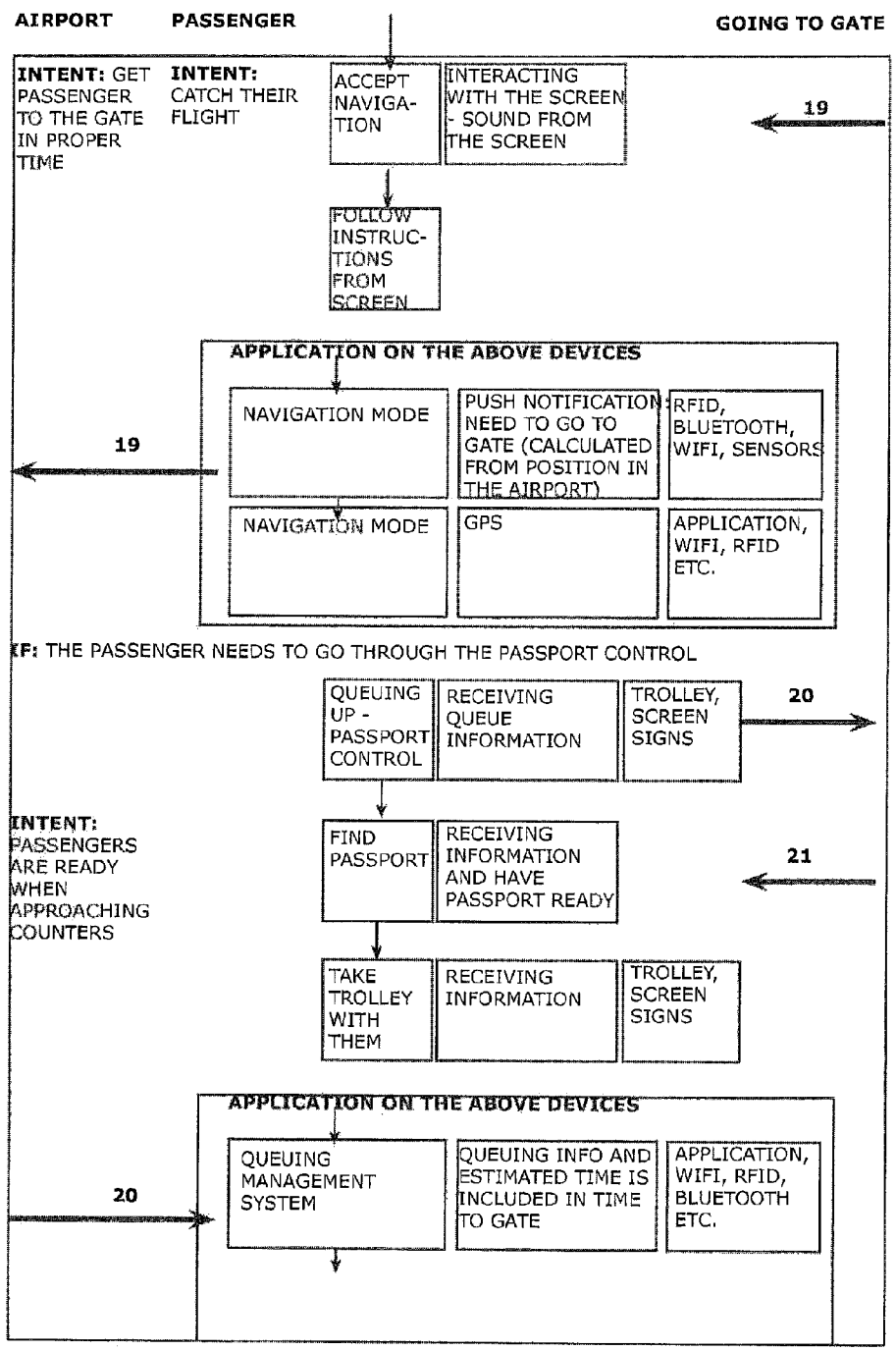
Figure 15B:
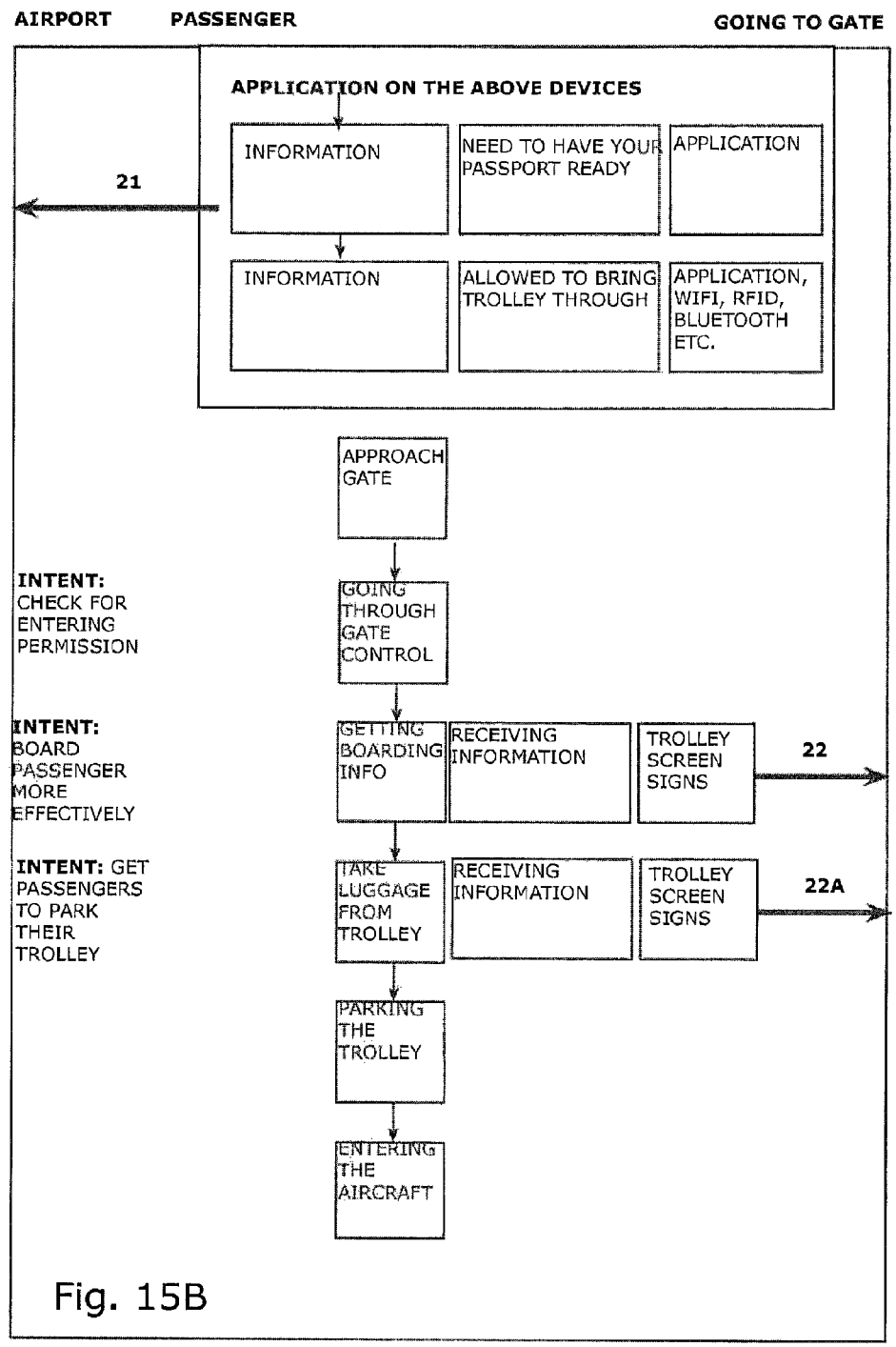
Figure 15C:
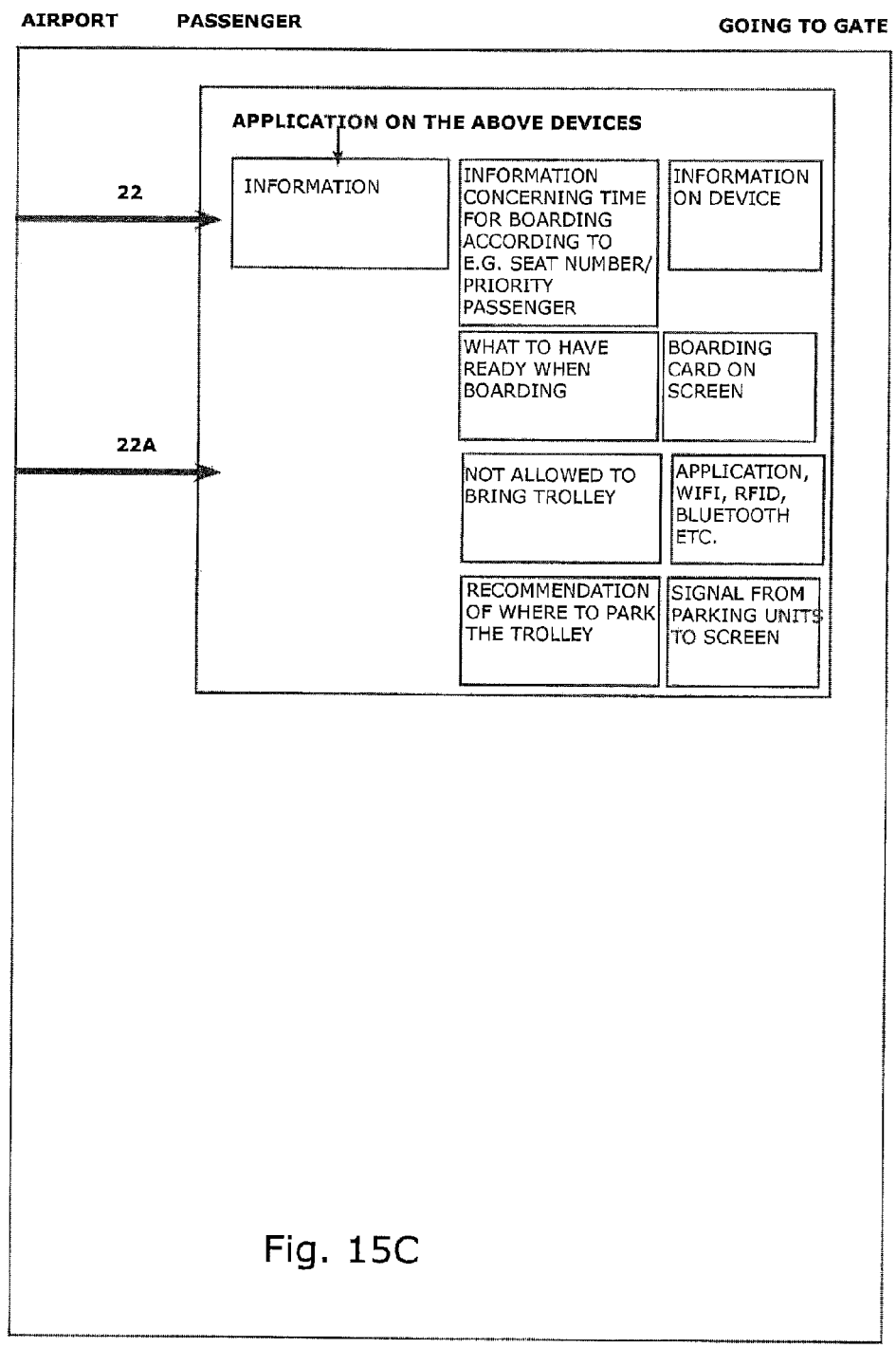
Figure 16:
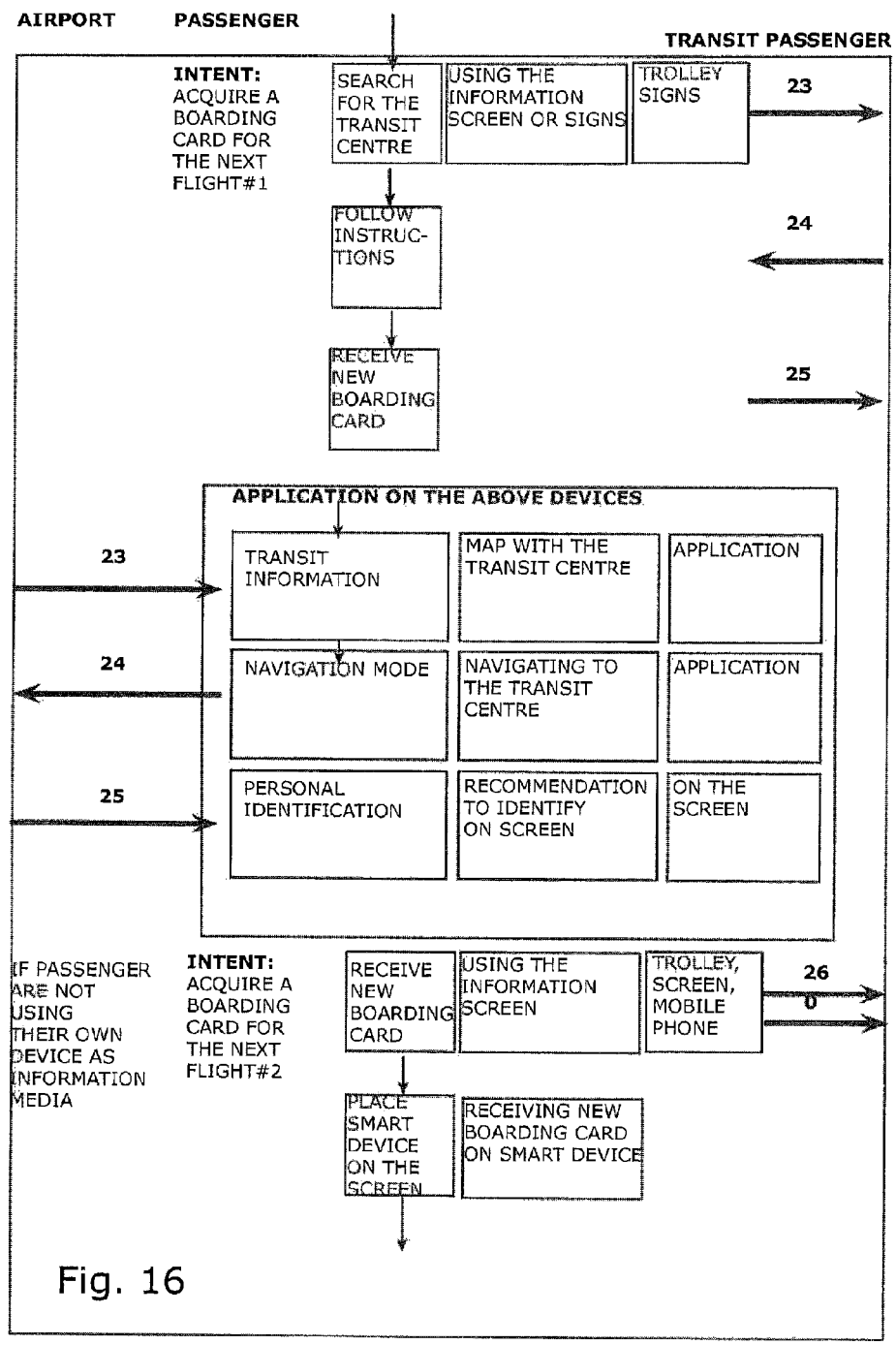
Figure 17:
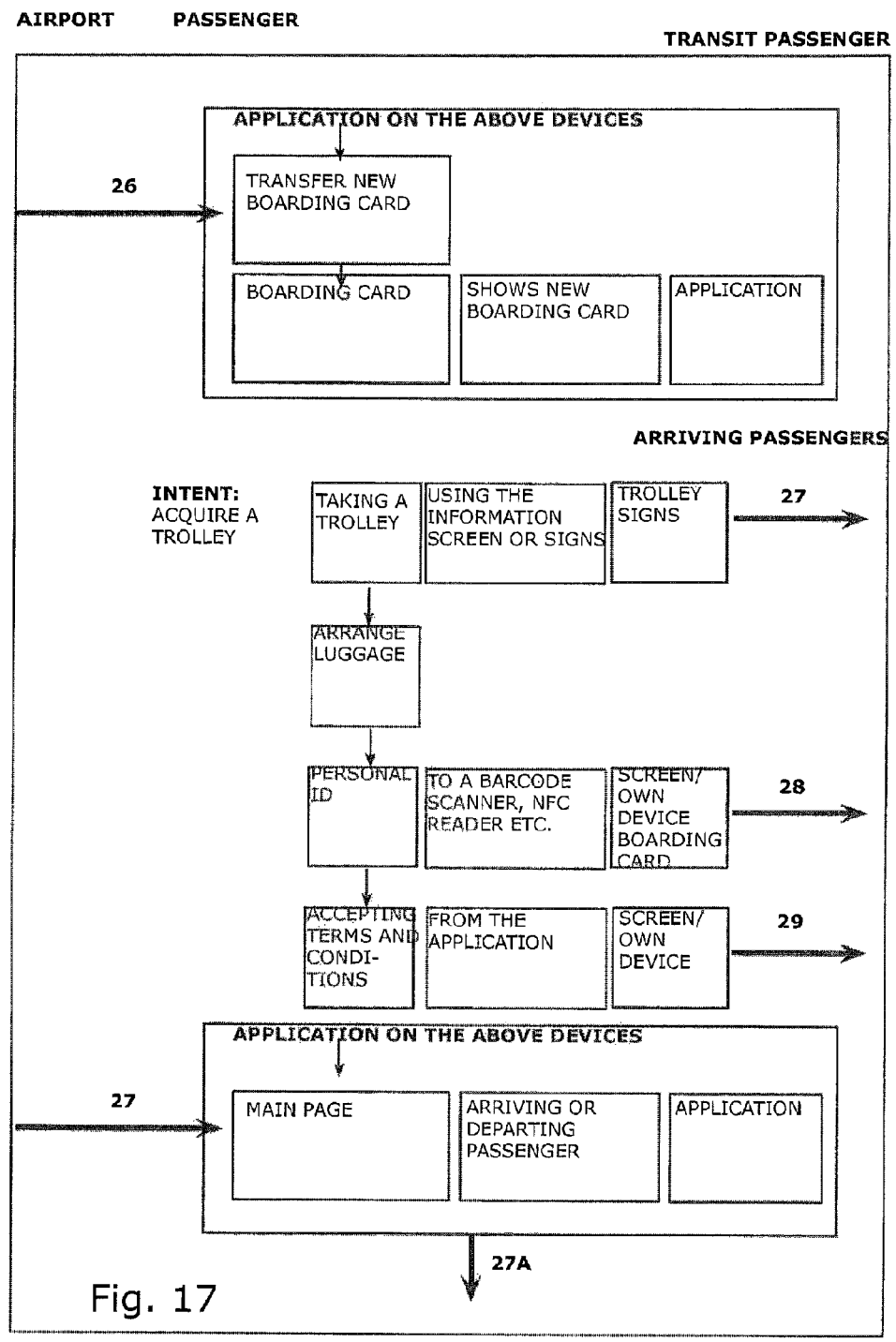
Figure 18A:
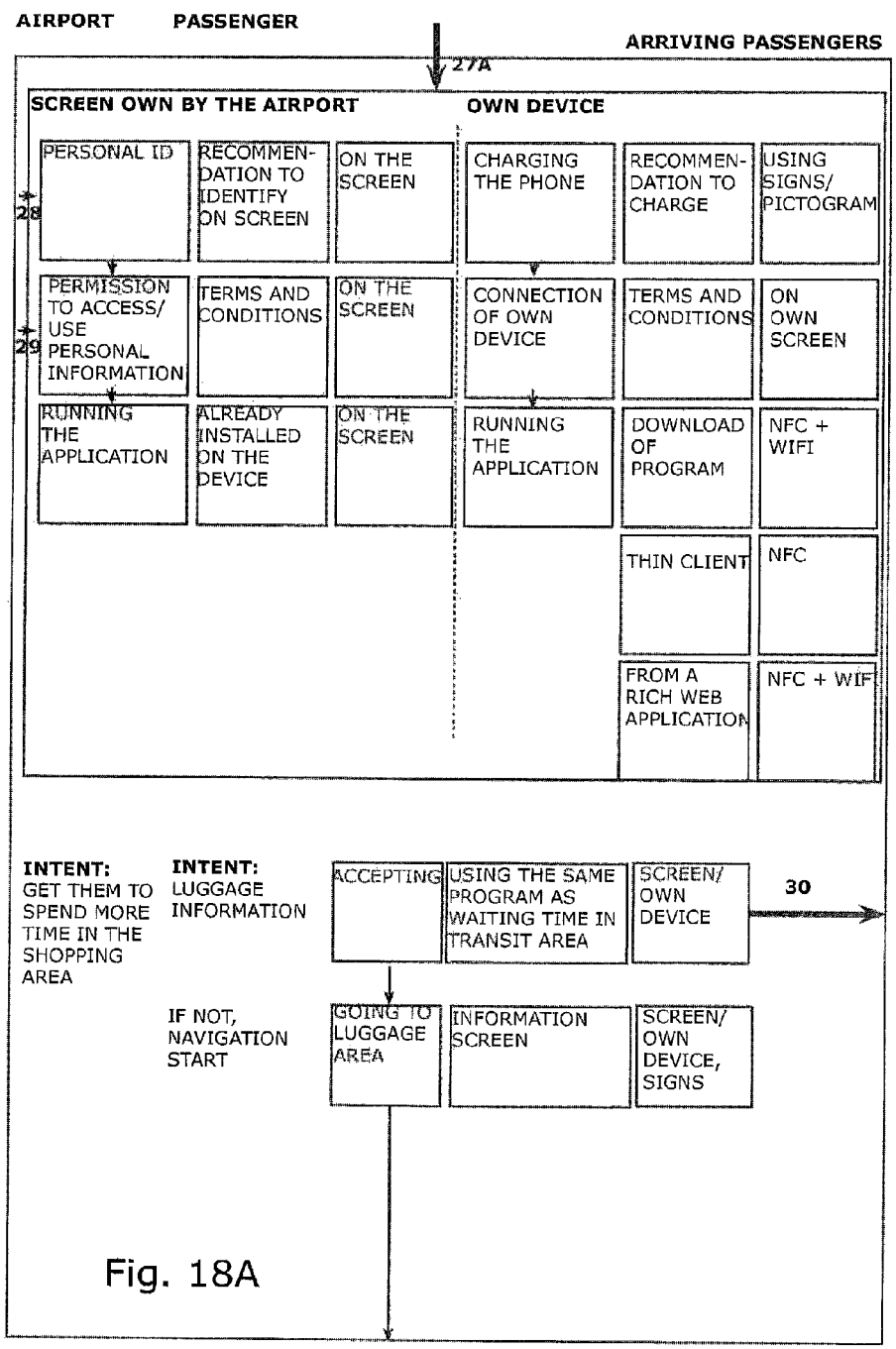
Figure 18B:
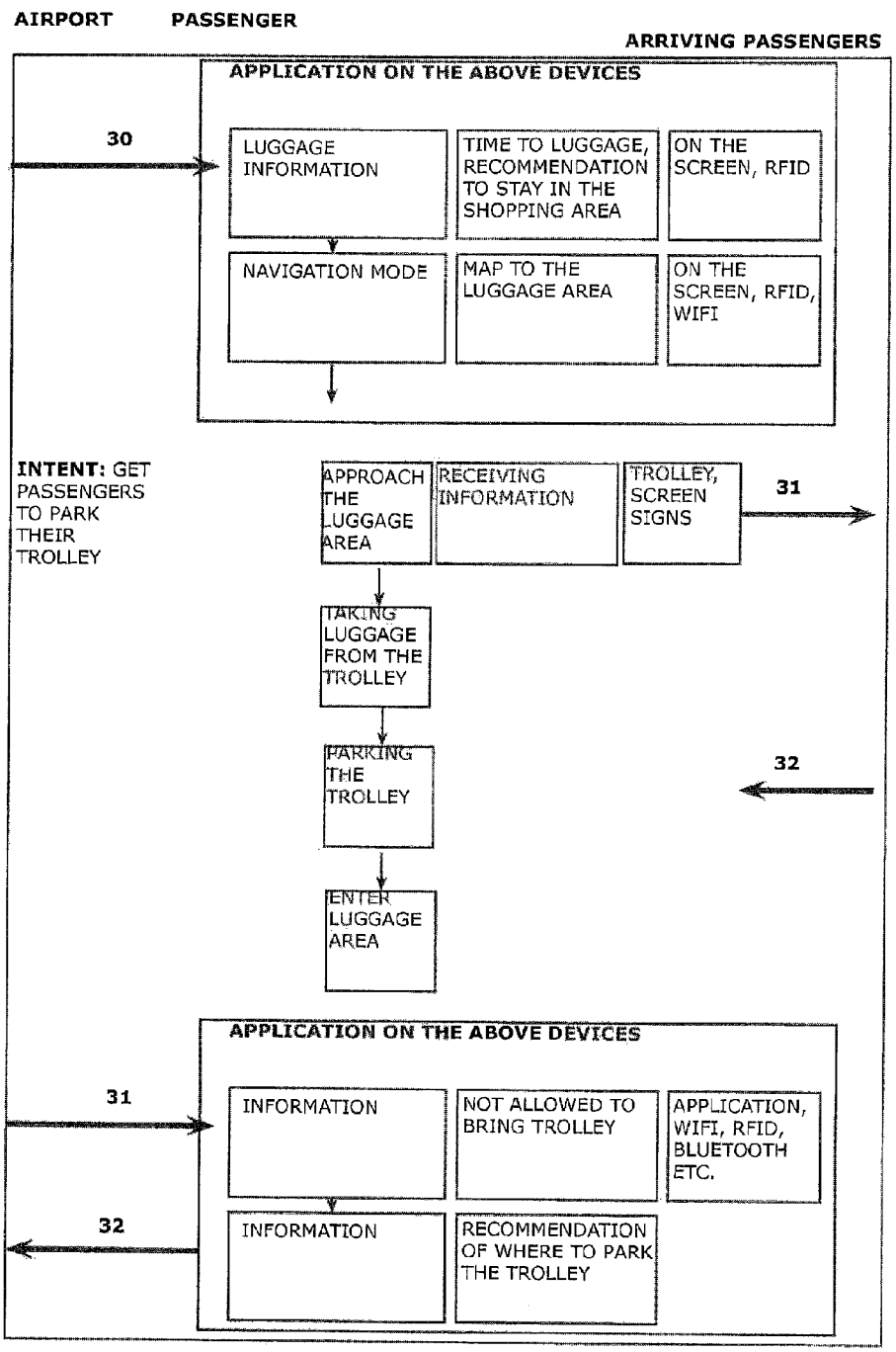
Figure 19A:
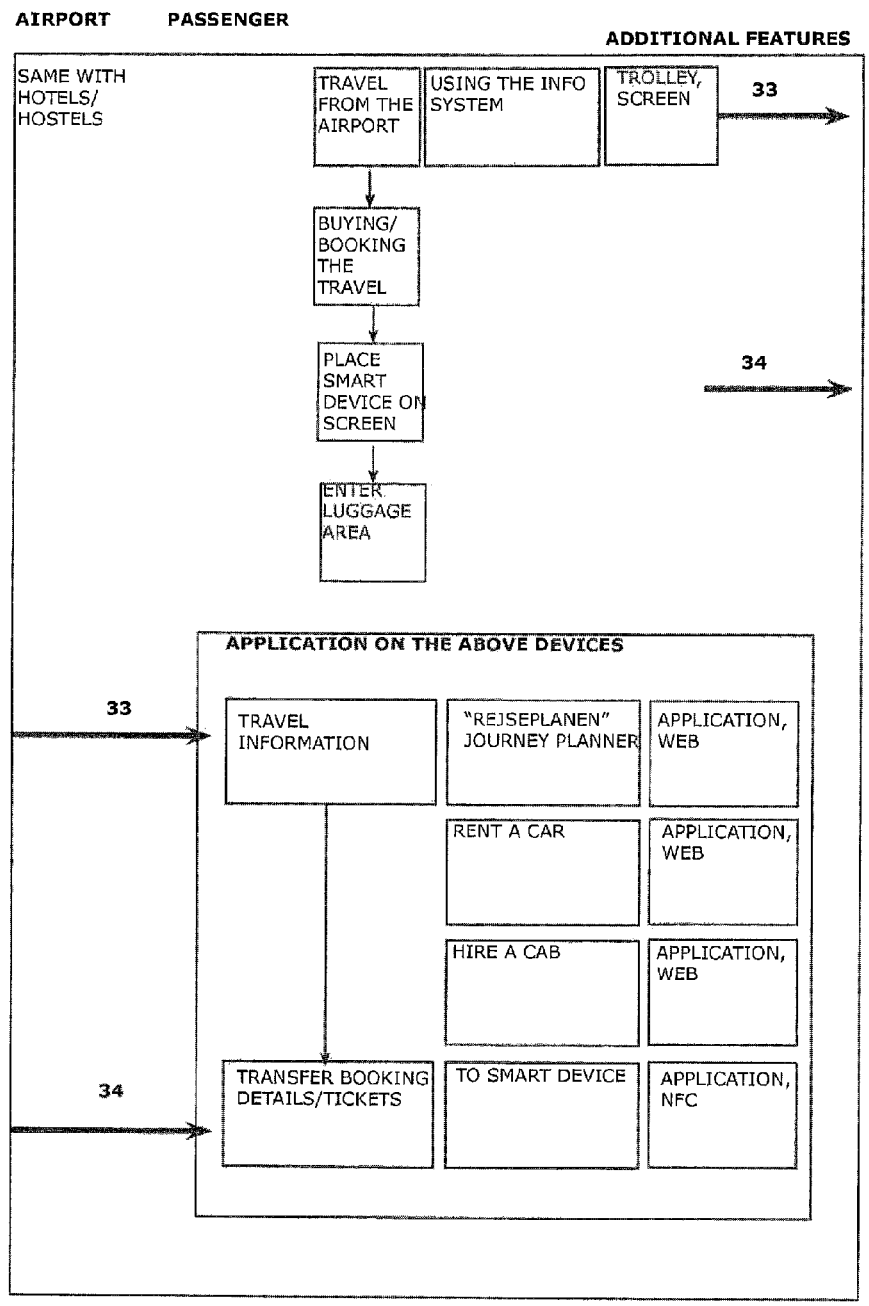

FIGS. 10-19 are flow charts generally illustrating an embodiment of the method of the present invention. FIGS. 10A-10C illustrate steps occurring at a landside and at a site before the passengers pass a security check-point within the airport. FIGS. 11A, 11B, and 12 illustrate those parts of the present embodiment of the invention, which occur at the security check-point. FIGS. 13 and 14A-14D illustrate those parts of the present embodiment of the method, which occur at a transit area, including during the passengers' waiting time in the transit area. FIGS. 15A-15C illustrate steps occurring when the passengers move to the departure gate. FIGS. 16 and 17 illustrate steps taking place in respect of transit passengers, i.e. passengers who have arrived with an incoming flight and are scheduled to depart with a further flight from the same airport without leaving the airport. FIGS. 18A and 18B illustrate steps undertaken in respect of arriving passengers at an airport terminal. FIGS. 19A and 19B illustrates various additional features of embodiments of the method according to the invention.

Figure 20:
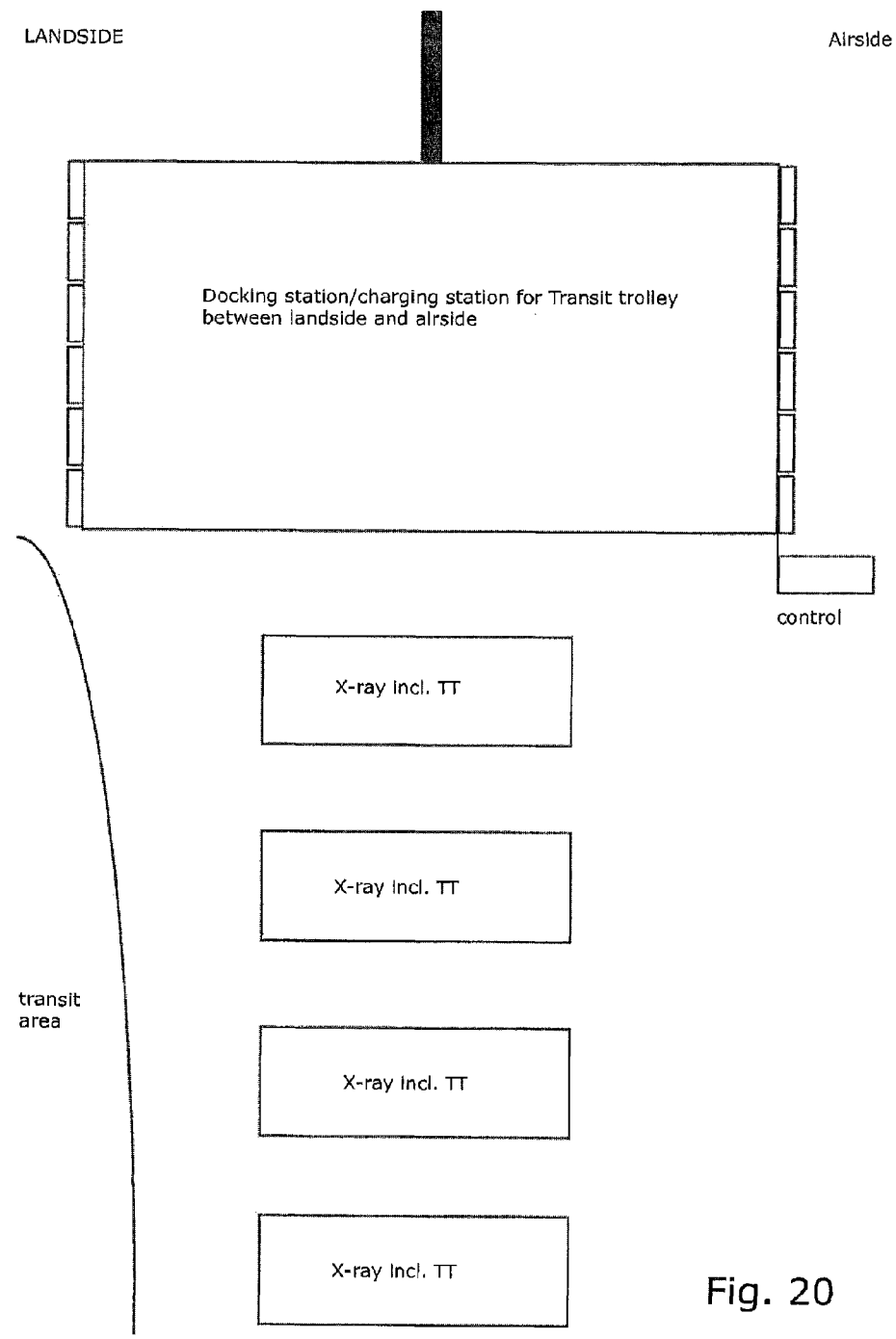
FIG. 20 illustrates an embodiment of a landside/airside/transit area of an airport terminal.

FIG. 20 illustrates an embodiment of a landside/airside/transit area of an airport terminal, with security check-points being marked "X-ray incl. TT".

Generally, the present invention allows passengers' identities to become known to security staff at security check-points of airports. For example, each passenger may be required to identify himself/herself prior to proceeding to a security and X-ray checkpoint for entering that part of the airport terminal restricted to air passengers. Hence, passengers of particular interest may, for example, be instructed to proceed to a particular security line, at which passengers are checked more thoroughly than at other lines. Instructions to this effect may be provided discretely via, e.g. a text message at a screen or monitor of the trolley. Such procedures may be complemented with a possibly camera-assisted surveillance or watch procedure to verify that the passenger indeed proceeds to the instructed line. Failure to comply with the instruction may in itself be an indicator to security staff to be cautious.

Identification of passengers or at least passenger-related data upstream of security also allows processing of images of carry-on items to correlate images of multiple security check-points to determine, e.g., if a suspiciously high amount of liquids is carried on to a single flight by a plurality of passengers, or if different components of a weapon or different ingredients for an explosive are carried onto the same flight by individual passengers.

Still further, the risk of inadvertent mixing of individual passengers' personal belongings or theft thereof downstream of the security checkpoint may be reduced if the passengers' carry-on items are conveyed through security while loaded onto a trolley Queuing downstream of the security checkpoint may also be reduced, as the passenger is immediately ready to walk on with the trolley already packed with his/hers belongings following X-raying thereof.

In one embodiment, the trolley of the present invention allows passengers to utilize the trolley's interface for checking in to flights. For example, the trolley may connect to a portable device of the passenger holding the passenger's ticket or reservation number, booking number or other flight- and passenger-identifying information. Communication between the electronic control unit of the trolley and the passenger's mobile device may be carried out by use of BlueTooth™ communication, NFC or other suitable means. Further, the trolley may be configured to provide printed or electronic boarding passes. For example, an electronic boarding pass issued through the trolley's communication interfaces, may be forwarded to the passenger's mobile device through wireless communication means known per se.

Generally, in the present invention, the trolley may comprise a communication port for communicating with a portable device belonging to the passenger, such as a mobile telephone, smartphone, PDA, tablet computer or laptop computer. The communication port preferably comprises the data output means for communicating at least the selected part of the airport information to the passenger. In such embodiments, the passenger carries the portable device when entering the airport terminal and establishes or accepts a connection of the portable device to the trolley, once the passenger is in the airport terminal and has selected a trolley. The trolley may alternatively be assigned to the passenger. The portable device may be pre-programmed with adequate software for communicating with the trolley, e.g. through a USB interface, by Bluetooth or any other suitable means of communication. The passenger may be prompted, through an interface of the portable device, to download software, such as an app, for communicating with the trolley. The portable device may hence be preloaded with software allowing it to communicate with the electronic control unit of the trolley before the passenger establishes or accepts the connection of the portable device to the trolley. Alternatively, the electronic control unit of the trolley may be configured to load, into the portable device, software allowing the electronic control unit to communicate with the portable device. In such embodiments, the step of establishing a connection of the portable device to the trolley occurs prior to a further step of loading the software into the portable device.

At the step of outputting the selected parts of the airport information data to the passenger, the selected parts may be communicated from the electronic control unit through the communication port. An alert may be generated at the portable device to inform the passenger of incoming information, such as a change of departure gate or the delay of the passenger's flight. At the latest when boarding the flight, the passenger preferably disconnects the portable device from the trolley.

The communication port of the portable device may comprise the interface of the trolley for receiving information identifying the passenger and/or the passenger's flight. At the step of identifying the passenger and/or the passenger's flight, data may be communicated from the portable device to the electronic control unit of the trolley through the communication port. The passenger may identify himself/herself to the portable device before entering the airport terminal, e.g. at the stage of checking in to the flight via the Internet at a remote location.

The trolley may be configured to charge a battery of the portable device. Hence the trolley may comprise an energy accumulating system. The battery of the portable device may accordingly be charged while it remains in the vicinity of the trolley, e.g. while it remains physically connected to the trolley.

The trolley may be configured to operate independently of a smartphone or other personal portable device of the passenger. For example, the trolley may comprise a frame and a user interface embedded in or integrated with the frame, such as in a monitor integral with or mounted to the frame. The passenger and/or the passenger's flight may hence be identified via the user interface, the selected parts of the airport information data may be communicated to the passenger occur via the user interface of the trolley.

In one embodiment, the computer network and wireless communication means may be utilized to track each of the trolleys' whereabouts. Accordingly, under the assumption that a passenger remains in the vicinity of his/her trolley, passengers may also be tracked. For example, in case a passenger does not present himself/herself at the departure gate at the time of boarding, that passenger may be located within the airport terminal. Hence, the passenger can efficiently be fetched and rushed to the gate, as opposed to the often inefficient loudspeaker calls, which widely are applied in most airports.

The mobile wireless communication means of the trolley may be e.g. based on Bluetooth® or any NFC (Near Field Communication) standard or protocol or any other means of appropriate connective communication. The method of the present invention may in one embodiment be configured allow passengers to make payments at the airport, such as paying a parking charge related to the parking of a car in a parking facility of the airport, or paying an excess luggage fee.

The method of the present invention may include the step of updating the passenger's account in a loyalty programme of an airline of an airport when the passenger checks in or undertakes certain actions at the airport, such as booking a hotel room, eating at selected restaurants, shopping at a selected stores or renting a car.

The airport terminal may generally comprise an area open to the public, a departure area accessible to flight passengers only, and a security checkpoint area separating the public area from the departure area. In case of passengers whose air journey commences in the airport, the steps of assigning one of the trolleys to each of the passengers and identifying, at the trolley, the passenger and/or the passenger's flight may occur in the area open to the public or in the departure area. In case of transit passengers arriving at the airport by plane and leaving again by plane, the steps of assigning one of the trolleys to each of the passengers and identifying, at the trolley, the passenger and/or the passenger's flight preferably occur in the departure area or in a designated transit area reserved to transit passengers.

In accordance with the procedure discussed above in relation to FIGS. 3 and 4, the passenger may load his/her carry-on items onto the trolley in the area open to the public, in which case the method according to the present invention may further comprise the steps of separating the passenger from the trolley at a site upstream of the security checkpoint area and X-raying the trolley at the security checkpoint area while the carry-on items remain loaded onto the trolley. A security check of the passenger may simultaneously be performed at the security checkpoint, and subsequently the passenger and the trolley may be united, while the carry-on items remain loaded onto the trolley.

The computer network of the airport terminal may utilize the number of trolleys in use and optionally the passenger's flight information to determine any possible need for increasing or decreasing the number of staff and/or the number of open passageways at a security check area. For example, where the security checkpoint area comprises a plurality of passageways between the area open to the public and the departure area, the passageways being staffed by human security staff, the method of the present invention may comprise determining, at the at least one server of the computer network, a number of trolleys assigned to passengers, who are present in the area open to the public. The method may further comprise using the number of trolleys and optionally the passenger's flight information to determine any possible need for increasing or decreasing the number of staff and/or the number of open passageways, also by distributing and even workload on the individual security lines by queue management that has the ability to advice individual passenger to the shortest queue and to advise disabled, families with children or others with special needs, as determined e.g. through boarding pass-derived knowledge, to specially dedicated security lines.

The electronic control unit of the trolley may be configured to generate passenger convenience data on the basis of at least one of an identification of the passenger's flight and/or the passenger's location within the airport terminal and/or other information available to the electronic control unit. The passenger convenience data may be individually selected in respect of each passenger, or at least some of the passenger convenience data may be common to all passengers. For example, the control unit may be programmed to inform the passenger of nearby restaurants in case the control unit determines that the passenger has time for a meal before scheduled gate opening of the passenger's departure gate. Such passenger convenience data may be communicated to the passenger in addition to the selected parts of the airport information data.

The invention claimed is:

1. A method for facilitating a flow of passengers in an airport terminal, comprising the steps of:
   providing a computer network within the airport terminal, the computer network being optionally connected to one or more remote networks, the computer network within the airport terminal comprising:
   at least one server comprising a data storage unit storing airport information data selected from flight departure information and passenger wayfinding information;
   stationary wireless communication means for dissemination of the airport information data;
   continuously or intermittently updating the airport information data in the data storage unit of the at least one server;
   providing a plurality of hand luggage trolleys;
   assigning one of the trolleys to each of the passengers, each trolley comprising:
   an interface for receiving information identifying the passenger, to which the trolley is assigned, and/or the passenger's flight;
   an electronic control unit connected to the interface, the electronic control unit comprising an electronic memory for storing passenger identification data and/or flight data of the passenger's flight;
   mobile wireless communication means for receiving, at the electronic control unit, said airport information data from the at least one server via the stationary wireless communication means of the computer network within the airport terminal, the mobile wireless communication being connected to the electronic control unit and arranged to forward the airport information data to the electronic control unit;

data output means connected to the electronic control unit and arranged to communicate, to the passenger, to which the trolley is assigned, at least a part of the airport information received by the electronic control unit;

identifying, at each of the trolleys, the passenger, to which the trolley is assigned, and/or the passenger's flight;

continuously or intermittently disseminating the airport information data to the trolleys;

receiving the airport information data at each of the trolleys;

selecting, by means of the electronic control unit of each of the trolleys, parts of the disseminated airport information data, to be forwarded to the passenger, to which the trolley is assigned;

outputting to the passenger the selected parts of the airport information data;

repeating the steps of updating, disseminating and receiving the airport information data as well as the step of outputting the selected parts of the airport information data, as long as the trolley remains assigned to the passenger, so as to thereby facilitate each of the passenger's way through the airport terminal, wherein the trolley further comprises a communication port for communicating with a portable device belonging to the passenger, such as a mobile telephone, smartphone, PDA, tablet computer or laptop computer, and wherein said communication port comprises the data output means for communicating at least said selected part of said airport information to the passenger;

and wherein:

the passenger carries the portable device when entering the airport terminal;

the passenger establishes or accepts a connection of the portable device to the trolley;

the step of outputting the selected parts of the airport info/illation data to the passenger comprises the step of communicating said selected parts from the electronic control unit through said communication port and generating an alert at the portable device;

the passenger disconnects the portable device from the trolley at the latest when boarding the flight.

2. The method according to claim 1, wherein the communication port of the portable device further comprises the interface of the trolley for receiving information identifying the passenger and/or the passenger's flight;

and wherein:

the step of identifying the passenger and/or the passenger's flight comprises the steps of communicating data from the portable device to the electronic control unit of the trolley through the communication port.

3. The method according to claim 1, wherein the trolley comprises an energy accumulating and the portable device comprises a battery;

and wherein the method comprises charging the battery of the portable device, while it remains in the vicinity of the trolley.

4. The method according to claim 1, wherein the portable device has been preloaded with software allowing it to communicate with the electronic control unit of the trolley before the passenger establishes or accepts the connection of the portable device to the trolley.

5. The method according to claim 1, wherein the electronic control unit of the trolley is configured to load, into the portable device, software allowing the electronic control unit to communicate with the portable device;

wherein the step of establishing a connection of the portable device to the trolley occurs prior to a further step of loading said software into the portable device.

6. The method according to claim 1, wherein the trolley comprises a frame and a user interface embedded in or integrated with the frame, such as with a screen or monitor thereof;

and wherein the steps of identifying the passenger and/or the passenger's flight and outputting said selected parts of the airport information data to the passenger occur via the user interface.

7. The method according to claim 1, further comprising the step of tracking, at said at least one server of the computer network, each of the trolleys' whereabouts.

8. The method according to claim 1, wherein the airport terminal comprises an area open to the public, a departure area accessible to flight passengers only, and a security checkpoint area separating the public area from the departure area, and wherein the steps of assigning one of the trolleys to each of the passengers and identifying, at the trolley, the passenger and/or the passenger's flight occur in the area open to the public in case of passengers whose air journey commences in the airport; and wherein said steps of assigning and identifying occur in a transit area of the airport open to transit passengers in case of passengers, who are in transit.

9. The method according to claim 8, wherein the passenger, to which the trolley is assigned loads his carry-on items onto the trolley in the area open to the public, the method further comprising the steps of:

separating the passenger from the trolley at a site upstream of the security checkpoint area;

x-raying the trolley at the security checkpoint area while the carry-on items remain loaded onto the trolley;

performing a security check of the passenger at the security checkpoint; and subsequently:

uniting the passenger and the trolley, while the carry-on items remain loaded onto the trolley.

10. The method according to claim 9, wherein the security checkpoint area comprises a plurality of passageways between the area open to the public and the departure area, the passageways being staffed by human security staff;

the method comprising the steps of:

determining, at said at least one server of the computer network, a number of trolleys assigned to passengers, who are present in the area open to the public;

using said number of trolleys and optionally the passenger's flight information to determine any possible need for increasing or decreasing the number of staff and/or the number of open passageways.

11. The method according to claim 1, wherein the electronic control unit of the trolley is configured to generate passenger convenience data on the basis of at least one of an identification of the passenger's flight and/or the passenger's location within the airport terminal and/or other information available to the electronic control unit;

the method comprising outputting said passenger convenience data to the passenger in addition to the selected parts of the airport information data.

12. The method according to claim 1, wherein the selected parts of the airport information data comprise a call for the passenger to proceed to the gate of the passenger's flight.

13. The method according to claim 1, wherein the selected parts of the airport information data comprise a message for the passenger to board the passenger's flight.

14. The method according to claim 13, wherein the computer network within the airport terminal is configured to prioritize the call for the passenger or said message for the passenger to board over the dissemination of other types of data.

15. A hand luggage trolley for use in an airport terminal in a method according to claim 1, comprising:
    an interface for receiving information identifying the passenger, to which the trolley is assigned, and/or the passenger's flight;
    an electronic control unit connected to the interface, the electronic control unit comprising an electronic memory for storing passenger identification data and/or flight data of the passenger's flight;
    mobile wireless communication means for receiving, at the electronic control unit, airport information data from a computer network within the airport terminal, the mobile wireless communication being connected to the electronic control unit and arranged to forward the airport information data to the electronic control unit;
    data output means connected to the electronic control unit and arranged to communicate, to the passenger, to which the trolley is assigned, at least a part of the airport information received by the electronic control unit;
    wherein the electronic control unit is configured to:
    identify the passenger, to which the trolley is assigned, and/or the passenger's flight;
    receive the airport information data;
    select parts of the disseminated airport information data to be forwarded to the passenger, to which the trolley is assigned;
    output to the passenger the selected parts of the airport information data.

16. The hand luggage trolley according to claim 15, the trolley being X-ray compliant.

17. The hand luggage trolley according to claim 15, comprising a communication interface for communicating with a portable device, such as a smartphone, Personal Digital Assistant (PDA) smart device or a similar device.

18. A hand luggage trolley according to claim 15, comprising a rechargeable battery pack and a charging interface for charging the battery pack when the trolley is parked in a charging dock.

19. The hand luggage trolley according to any of claim 15, comprising a rechargeable battery pack and a generator for charging the battery pack, the generator being configured to convert mechanical energy deriving from the trolley's motion to electrical energy.

20. A system comprising a plurality of trolleys according to claim 15 and at least one charging dock for charging the battery pack of the trolley, when the trolley is parked in the charging dock.

21. A method for facilitating a flow of passengers in an airport terminal, comprising the steps of:
    providing a computer network within the airport terminal, the computer network being optionally connected to one or more remote networks, the computer network within the airport terminal comprising:
    at least one server comprising a data storage unit storing airport information data selected from flight departure information and passenger wayfinding information;
    stationary wireless communication means for dissemination of the airport information data;
    providing a plurality of hand luggage trolleys;
    assigning one of the trolleys to each of the passengers, each trolley comprising:
    an interface for receiving information identifying the passenger, to which the trolley is assigned, and/or the passenger's flight;
    an electronic control unit connected to the interface, the electronic control unit comprising an electronic memory for storing passenger identification data and/or flight data of the passenger's flight;
    mobile wireless communication means for receiving, at the electronic control unit, said airport information data from the at least one server via the stationary wireless communication means of the computer network within the airport terminal, the mobile wireless communication being connected to the electronic control unit and arranged to forward the airport information data to the electronic control unit;
    data output means connected to the electronic control unit and arranged to communicate, to the passenger, to which the trolley is assigned, at least a part of the airport information received by the electronic control unit;
    identifying, at each of the trolleys, the passenger, to which the trolley is assigned, and/or the passenger's flight;
    continuously or intermittently disseminating the airport information data to the trolleys;
    receiving the airport information data at each of the trolleys;
    outputting to the passenger the selected parts of the airport information data;
    so as to thereby facilitate each of the passenger's way through the airport terminal, wherein the airport terminal comprises an area open to the public, a departure area accessible to flight passengers only, and a security checkpoint area separating the public area from the departure area, and wherein the security checkpoint area comprises a plurality of passageways between the area open to the public and the departure area, the passageways being staffed by human security staff;
    the method comprising the steps of:
    determining, at said at least one server of the computer network, a number of trolleys assigned to passengers, who are present in the area open to the public;
    using said number of trolleys and optionally the passenger's flight information to determine any possible need for increasing or decreasing the number of staff and/or the number of open passageways.

22. A method for facilitating a flow of passengers in an airport terminal, comprising the steps of:
    providing a computer network within the airport terminal, the computer network being optionally connected to one or more remote networks, the computer network within the airport terminal comprising:
    at least one server comprising a data storage unit storing airport information data selected from flight departure information and passenger wayfinding information;
    stationary wireless communication means for dissemination of the airport information data;
    continuously or intermittently updating the airport information data in the data storage unit of the at least one server;
    providing a plurality of hand luggage trolleys;
    assigning one of the trolleys to each of the passengers, each trolley comprising:

an interface for receiving information identifying the passenger, to which the trolley is assigned, and/or the passenger's flight;

an electronic control unit connected to the interface, the electronic control unit comprising an electronic memory for storing passenger identification data and/or flight data of the passenger's flight;

mobile wireless communication means for receiving, at the electronic control unit, said airport information data from the at least one server via the stationary wireless communication means of the computer network within the airport terminal, the mobile wireless communication being connected to the electronic control unit and arranged to forward the airport information data to the electronic control unit;

data output means connected to the electronic control unit and arranged to communicate, to the passenger, to which the trolley is assigned, at least a part of the airport information received by the electronic control unit;

identifying, at each of the trolleys, the passenger, to which the trolley is assigned, and/or the passenger's flight;

continuously or intermittently disseminating the airport information data to the trolleys;

receiving the airport information data at each of the trolleys;

outputting to the passenger the selected parts of the airport information data;

so as to thereby facilitate each of the passenger's way through the airport terminal, wherein the electronic control unit of the trolley is configured to generate passenger convenience data on the basis of at least one of an identification of the passenger's flight and/or the passenger's location within the airport terminal and/or other information available to the electronic control unit;

the method comprising outputting said passenger convenience data to the passenger in addition to the selected parts of the airport information data.

23. A method for facilitating a flow of passengers in an airport terminal, comprising the steps of:

providing a computer network within the airport terminal, the computer network being optionally connected to one or more remote networks, the computer network within the airport terminal comprising:

at least one server comprising a data storage unit storing airport information data selected from flight departure information and passenger wayfinding information;

stationary wireless communication means for dissemination of the airport information data;

continuously or intermittently updating the airport information data in the data storage unit of the at least one server;

providing a plurality of hand luggage trolleys;

assigning one of the trolleys to each of the passengers, each trolley comprising:

an interface for receiving information identifying the passenger, to which the trolley is assigned, and/or the passenger's flight;

an electronic control unit connected to the interface, the electronic control unit comprising an electronic memory for storing passenger identification data and/or flight data of the passenger's flight;

mobile wireless communication means for receiving, at the electronic control unit, said airport information data from the at least one server via the stationary wireless communication means of the computer network within the airport terminal, the mobile wireless communication being connected to the electronic control unit and arranged to forward the airport information data to the electronic control unit;

data output means connected to the electronic control unit and arranged to communicate, to the passenger, to which the trolley is assigned, at least a part of the airport information received by the electronic control unit;

identifying, at each of the trolleys, the passenger, to which the trolley is assigned, and/or the passenger's flight;

continuously or intermittently disseminating the airport information data to the trolleys;

receiving the airport information data at each of the trolleys;

selecting, by means of the electronic control unit of each of the trolleys, parts of the disseminated airport information data, to be forwarded to the passenger, to which the trolley is assigned;

outputting to the passenger the selected parts of the airport information data;

repeating the steps of updating, disseminating and receiving the airport information data as well as the step of outputting the selected parts of the airport information data, as long as the trolley remains assigned to the passenger, so as to thereby facilitate each of the passenger's way through the airport terminal.

\* \* \* \* \*